US012716599B2

(12) United States Patent
Zakula et al.

(10) Patent No.: US 12,716,599 B2
(45) **Date of Patent: *Aug. 25, 2026**

(54) VENTILATING SYSTEM

(71) Applicant: Broan-NuTone LLC, Hartford, WI (US)

(72) Inventors: Mirko Zakula, New Berlin, WI (US); Corey Scott Jacak, West Bend, WI (US); Anup Nikam, Hartford, WI (US); Thomas Dare, Hartford, WI (US); James Bohn, Hartford, WI (US); Santosh Narasimhan, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/945,908

(22) Filed: Nov. 13, 2024

(65) Prior Publication Data

US 2025/0244031 A1 Jul. 31, 2025

Related U.S. Application Data

(63) Continuation of application No. 18/422,452, filed on Jan. 25, 2024, now Pat. No. 12,173,925.

(51) Int. Cl.

| | |
|---|---|
| ***F24F 7/007*** | (2006.01) |
| ***F21V 33/00*** | (2006.01) |
| ***F21Y 115/10*** | (2016.01) |
| ***F24F 13/00*** | (2006.01) |
| ***F24F 13/078*** | (2006.01) |

(52) U.S. Cl.

CPC .......... *F24F 7/007* (2013.01); *F21V 33/0088* (2013.01); *F24F 13/00* (2013.01); *F24F 13/078* (2013.01); *F21Y 2115/10* (2016.08); *Y10T 29/49002* (2015.01); *Y10T 29/49236* (2015.01)

(58) Field of Classification Search

CPC .......... F24F 7/007; F24F 13/00; F24F 13/078; F21V 33/0088; F21Y 2115/10; Y10T 29/49002; Y10T 29/49236

See application file for complete search history.

(56) References Cited

U.S. PATENT DOCUMENTS

| | | | | |
|---|---|---|---|---|
| 9,609,407 B2 * | 3/2017 | Berkman | ................. | H04R 1/02 |
| 2010/0009621 A1 * | 1/2010 | Hsieh | ...................... | F24F 7/007 454/349 |
| 2011/0188241 A1 * | 8/2011 | Walczak | .................. | F21S 4/00 362/249.02 |

* cited by examiner

*Primary Examiner* — Tsion Tumebo

(74) *Attorney, Agent, or Firm* — Hansen Reynolds LLC

(57) ABSTRACT

A ventilating system includes a main housing defining an inlet configured to receive air into the main housing and an outlet configured to allow the air to exit the main housing. The system further includes a fan in the main housing and configured and arranged to generate a flow of air into the main housing through the inlet and from the main housing through the outlet. The system further includes a grille configured to be coupled to the main housing, a plate configured to be coupled to the grille, and a lens coupled to the plate.

20 Claims, 21 Drawing Sheets

VENTILATING SYSTEM

PRIORITY CLAIM

This application is a continuation-in-part of U.S. patent application Ser. No. 29/750,744, filed Sep. 16, 2020, which is a continuation of U.S. patent application Ser. No. 16/424,621 filed May 29, 2019, now U.S. Pat. No. 10,801,743, which is a continuation of U.S. patent application Ser. No. 15/640,034 filed Jun. 30, 2017, now U.S. Pat. No. 10,344,992, which is a continuation of U.S. patent application Ser. No. 14/631,306 filed Feb. 25, 2015, abandoned, which is a continuation of U.S. patent application Ser. No. 13/190,386 filed Jul. 25, 2011, now U.S. Pat. No. 8,967,832, which is a continuation-in-part of U.S. patents application Ser. Nos. 12/902,077 and 12/902,065, both of which were filed on Oct. 11, 2010, the benefit of which is claimed hereby, and each of which are incorporated by reference herein in its entirety.

BACKGROUND

Conventional lighting and ventilating systems can combine elements of a conventional room ventilating fan with a light fixture. These apparatuses can have a bulky, unaesthetic appearance, can employ a complicated design, can fail to adequately cool the light fixture, and/or can employ a design where the components of the apparatus are inefficiently arranged. Additionally, many conventional lighting and ventilating systems can include only one illumination source which can lack certain useful functions, including a failure to provide lighting when the ventilating system is quiescent.

SUMMARY

According to the present disclosure, a ventilating system includes a main housing defining an inlet configured to receive air into the main housing and an outlet configured to allow the air to exit the main housing. The system further includes a fan in the main housing and configured and arranged to generate a flow of air into the main housing through the inlet and from the main housing through the outlet.

In illustrative embodiments, the system further includes a grille configured to be coupled to the main housing. The grille defines at least one aperture configured to admit air therethrough and toward the fan.

In illustrative embodiments, the system may further include a plate configured to be coupled to the grille. The plate may include a top wall spaced apart from the grille and a plurality of tapered side walls extending downwardly and outwardly away from the top wall. An air path may be defined between the plate and the grille so that air can flow into the main housing after passing between the plate and the grille and through at least one aperture.

In illustrative embodiments, the system may further include a lens coupled to the plurality of side walls of the plate. The lens may have a lower surface facing away from the plate and the grille. The plate and the lens may cooperate to define an interior space therebetween.

In illustrative embodiments, the system may further include a first set of illumination devices coupled to the top wall of the plate. The first set of illumination devices may be arranged in a grid formation along the top wall of the plate within the interior space. The first set of illumination devices may face downward away from the top wall to illuminate the lens in a first illumination mode of the ventilating system. In illustrative embodiments, the system may further include a second illumination device facing upwardly away from the top wall of the plate and configured to illuminate a lower surface of the grille in a second illumination mode of the ventilating system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
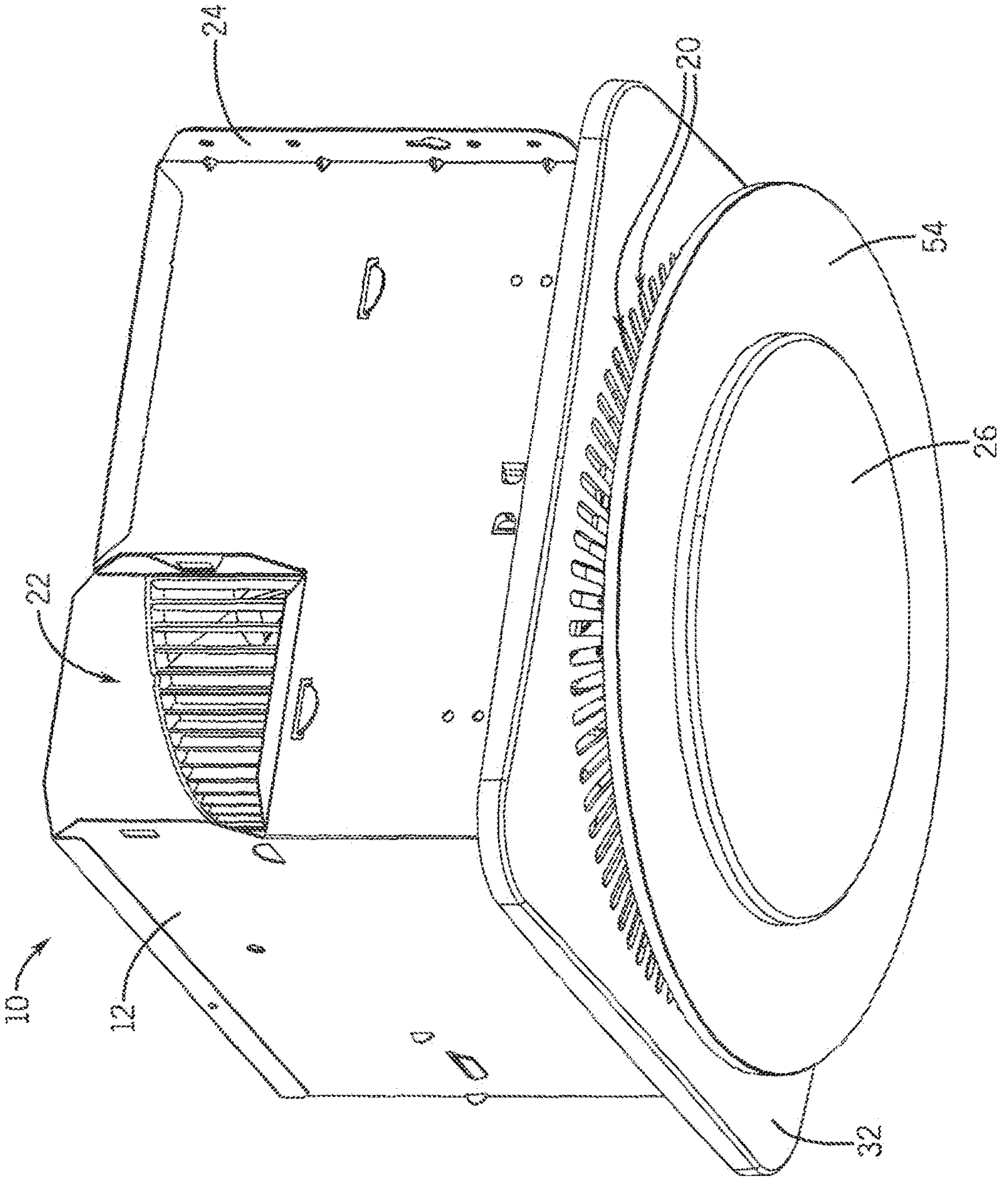
FIG. 1 is a perspective view of a lighting and ventilating system according to one embodiment of the invention.
Figure 9:
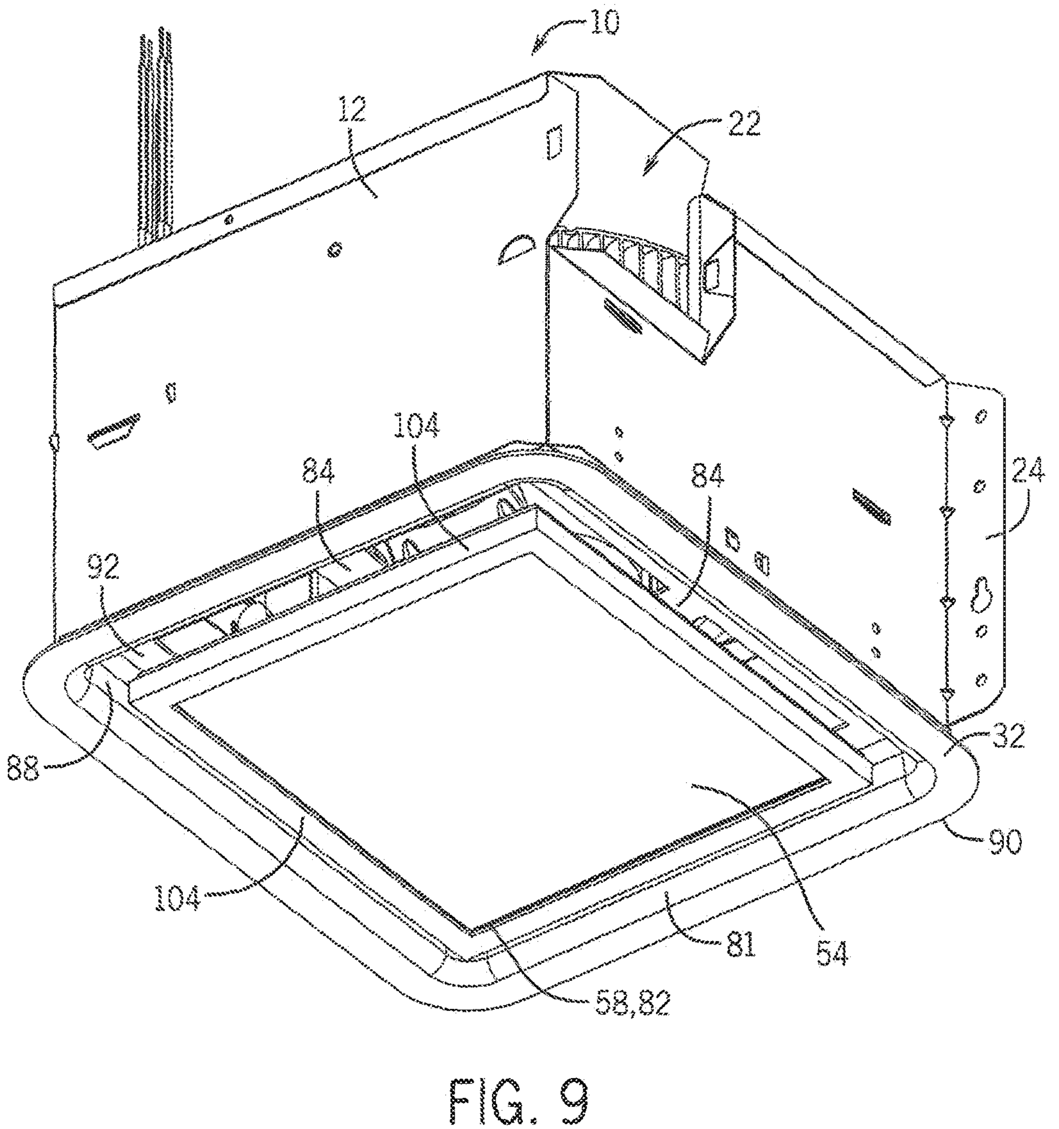
FIG. 9 is a perspective view of a lighting and ventilating system according to one embodiment of the invention.

FIGS. 1 and 9 illustrate a lighting and ventilating system 10 according to one embodiment of the invention. Some embodiments of the system 10 can include several components and devices that can perform various functions. In some embodiments of the present invention, the system 10 can include a main housing 12, which can house components of the system 10. The system 10 generally can include a ventilating assembly 14, a lamp housing 16, a first set of illumination devices 18, at least one aperture 20, a ventilation outlet 22, at least one mounting apparatus 24 which can be used to mount the lighting and ventilating system 10 to a surface or a support structure, electrical components, a lens 26, a motor 28, and at least one electrical socket 30. In some embodiments, the system 10 can be used to illuminate and/or ventilate any room, area, or space. In some embodiments, the system 10 can illuminate the room, area, or space independently of ventilating the room, area, or space. Further, in some embodiments, the system 10 can provide different intensities of illumination to the room, area, or space.

As shown in FIG. 1, in some embodiments, the main housing 12 can comprise any material which can withstand varying temperatures (i.e., to withstand any heat radiated and/or conducted from the illumination devices, the motor, or other components) while providing structural support to the system 10. In some embodiments, the main housing 12 can be formed of sheet metal, however, the main housing 12 also can be fabricated from ceramic or a polymer comprising a relatively high melting temperature. The main housing 12 can be formed into any shape, including, but not limited to, a rectangular box-like shape, an oval shape, a hemispherical shape, a spherical shape, a pyramidal shape, or any other shape. The main housing 12 can form a base or a similar support structure of the system 10. Further, in some embodiments, the main housing 12 can provide points and areas of attachment for other components of the system 10.

As shown in FIG. 1, in some embodiments, the main housing 12 can include or can be used in conjunction with at least one mounting apparatus 24 for installing the system 10 to any variety of support structures or surfaces. Any type of mounting apparatus 24 can be included with the main housing 12. In some embodiments, the main housing 12 can include two mounting apparatuses 24 fabricated from sheet metal. Although the mounting apparatuses 24 can be positioned anywhere on the main housing 12 so that the main housing can be supported with respect to any surrounding structure into which it can be installed, in some embodiments, the mounting apparatuses 24 can be positioned along opposite walls of the main housing 12. In other embodiments, the main housing 12 can be coupled to a support structure or a surface using a variety of fasteners and coupling methods (not shown).

In some embodiments of the invention, a grille 32 can be coupled to the main housing 12. In some embodiments, the grille 32 can be formed in a generally square-like shape, although the grille 32 can take any shape, including an oval shape, a hemispherical shape, a spherical shape, a pyramidal shape, or any other shape. Further, in some embodiments, the grille 32 can be configured so that it substantially matches the shape of the main housing 12. The grille 32 can be formed from injection-molded polymers, injection-molded polycarbonate, sheet metal, or any other suitable material.

Figure 7:
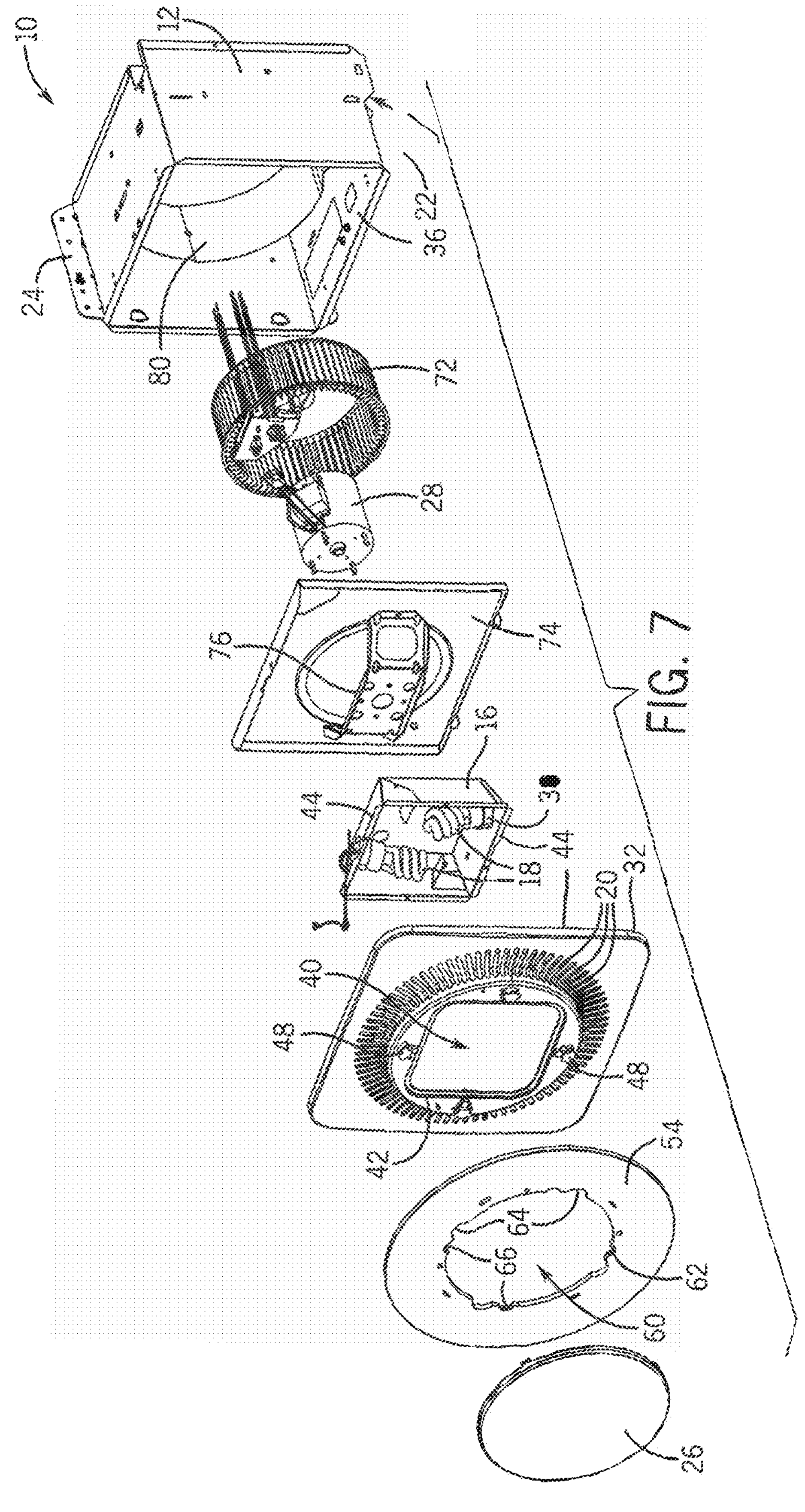
FIG. 7 is an exploded view of a lighting and ventilating system according to one embodiment of the invention.

As shown in FIGS. 1, 7 and 9, in some embodiments, the grille 32 can be positioned over an open end of the main housing 12. In some embodiments, the open end of the main housing 12 can be shaped and dimensioned to be received within an open end of the grille 32. The grille 32 can be secured to the main housing 12 by one or more snap-fit features on the grille 32 and/or the main housing 12. Additionally, in some embodiments, the one or more snap-fit features can be supplemented or largely replaced by any variety of couplings, such as screws, grille springs, bolts, rivets, pins, clamps, glue or other adhesive, and any other similar coupling. In some embodiments, the main housing 12 and the grille 32 can be further secured through other coupling practices such as welding, soldering, brazing, adhesive or cohesive bonding material, any combination of the foregoing, or any other similar coupling practice.

Figure 2:
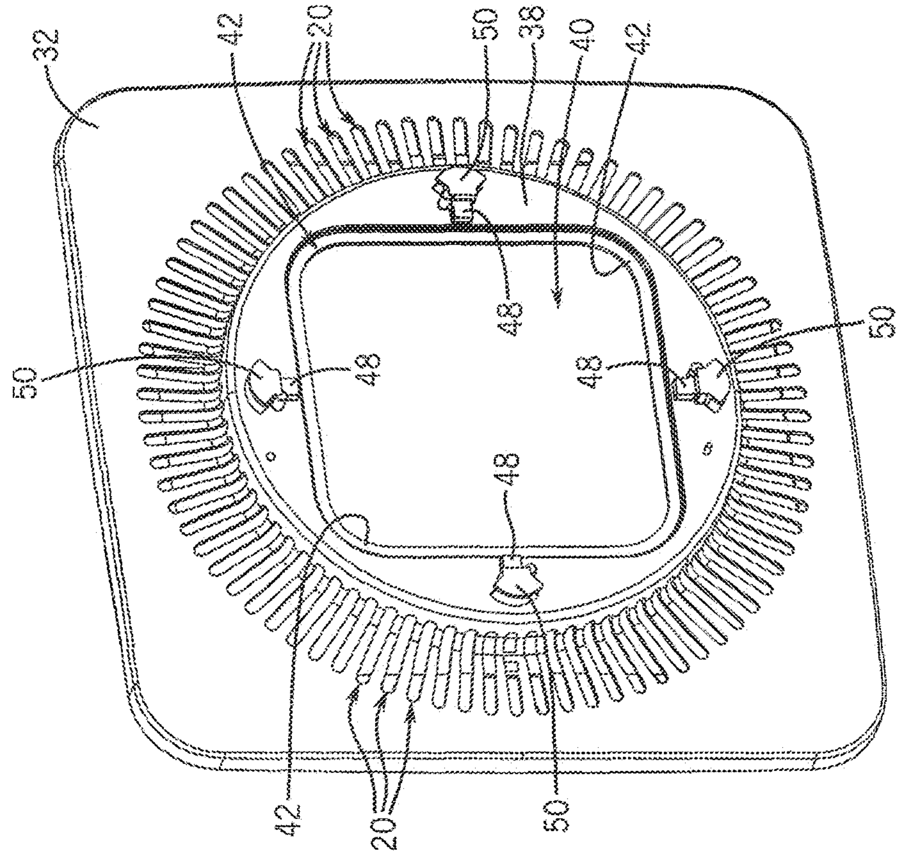
FIG. 2 is a perspective view of a grille according to one embodiment of the invention.
Figure 3:
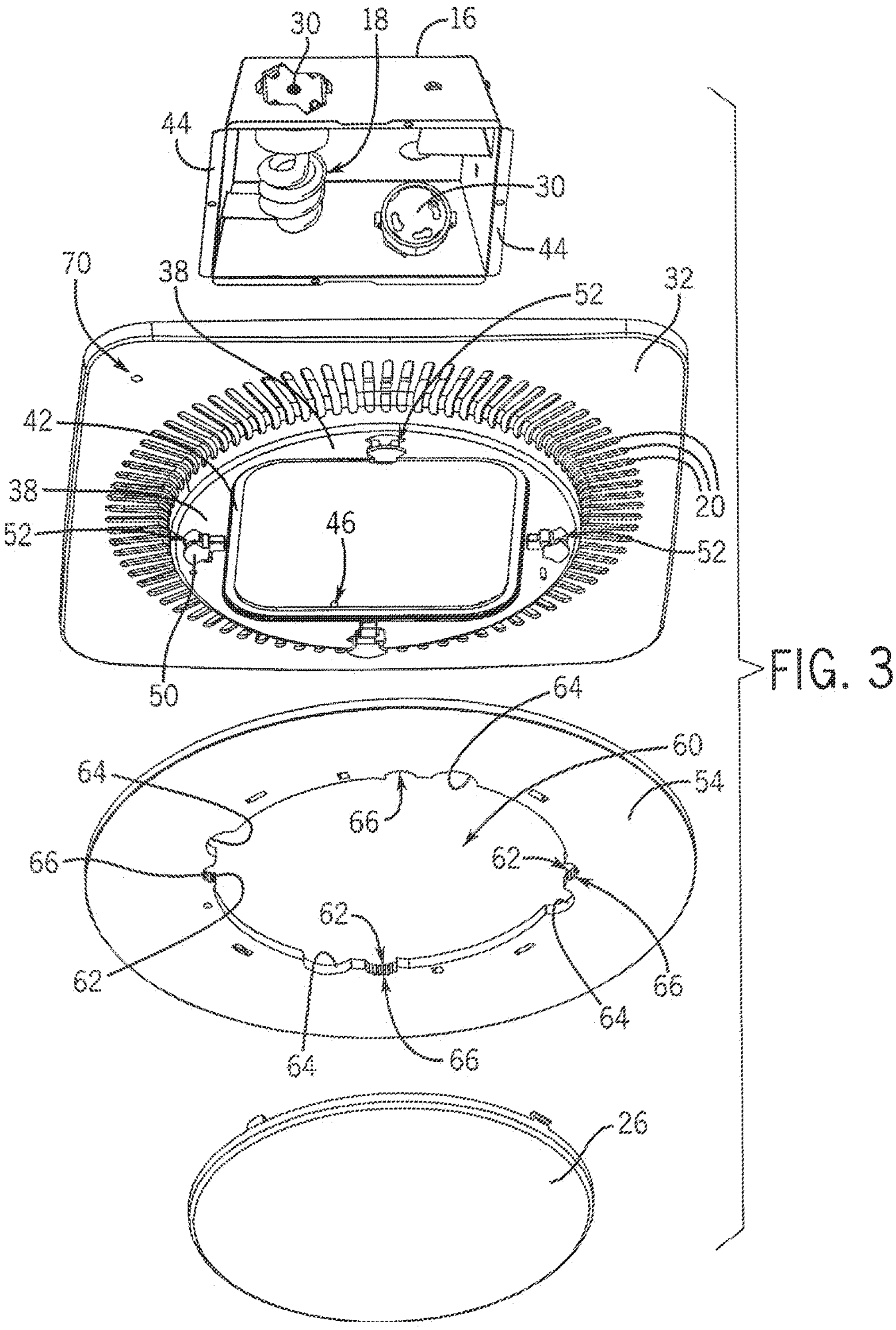
FIG. 3 is a perspective of a lamp housing, grille, plate, and lens according to one embodiment of the invention.

Referring to FIGS. 1-3, in some embodiments, the main housing 12 can include one or more lips, flared edges, flanges, or other features to which the grille 32 can be coupled. In some embodiments, the main housing 12 can include a first set of peripheral flanges 34 to which the grille 32 can be coupled. In other embodiments, the grille 32 can be shaped and dimensioned to be received within the main housing 12 and the grille 32 can be coupled to the main housing 12 using any of the above described methods. In some embodiments, the grille 32 and the main housing 12 can include apertures through which fasteners can be passed to couple the grille 32 and the main housing 12. Any of the previously described couplings can be used to couple the grille 32 and the main housing 12.

In some embodiments of the invention, the grille 32 can include the apertures 20. In some embodiments, the apertures 20 can extend across an inlet 36, which can be defined by the main housing 12. The apertures 20 can be used for receiving a flow of air. The plurality of apertures 20 can be located anywhere on the grille 32. In some embodiments, the location of the apertures 20 can be at least partially determined by airflow path(s) which can be available from the apertures 20, through the inlet 36, and into the ventilating assembly 14. In some embodiments, the apertures 20 can be located substantially around a perimeter of a region 38 of the grille 32. In some embodiments, the location of the apertures 20 can be selected substantially based on aesthetics, functionality, and other considerations that can be important to a user and/or a manufacturer.

As best seen in FIGS. 2 and 3, in some embodiments, the apertures 20 can guide air into the system 10. Air can include moisture, steam, exhaust, smoke, effluent, or anything similar. In some embodiments, after passing through the apertures 20 and entering the inlet 36 of the main housing 12, the air can enter the ventilating assembly 14, which can be included in the main housing 12, as discussed below. In some embodiments, the ventilating assembly 14 can be operable to discharge the airflow to another location, such as an attic, outside of the structure in which the system 10 can be secured, and/or to a duct network. Further, the airflow can be discharged from the ventilation outlet 22 of the main housing 12, in some embodiments.

Figure 10A:
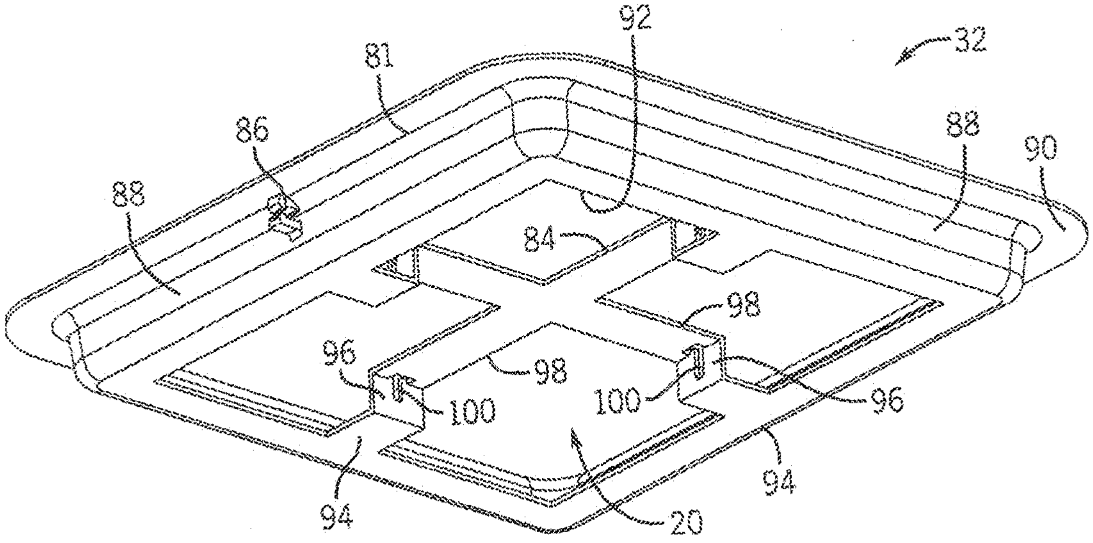
FIG. 10A is a rear perspective view of a grille according to one embodiment of the invention.
Figure 10B:
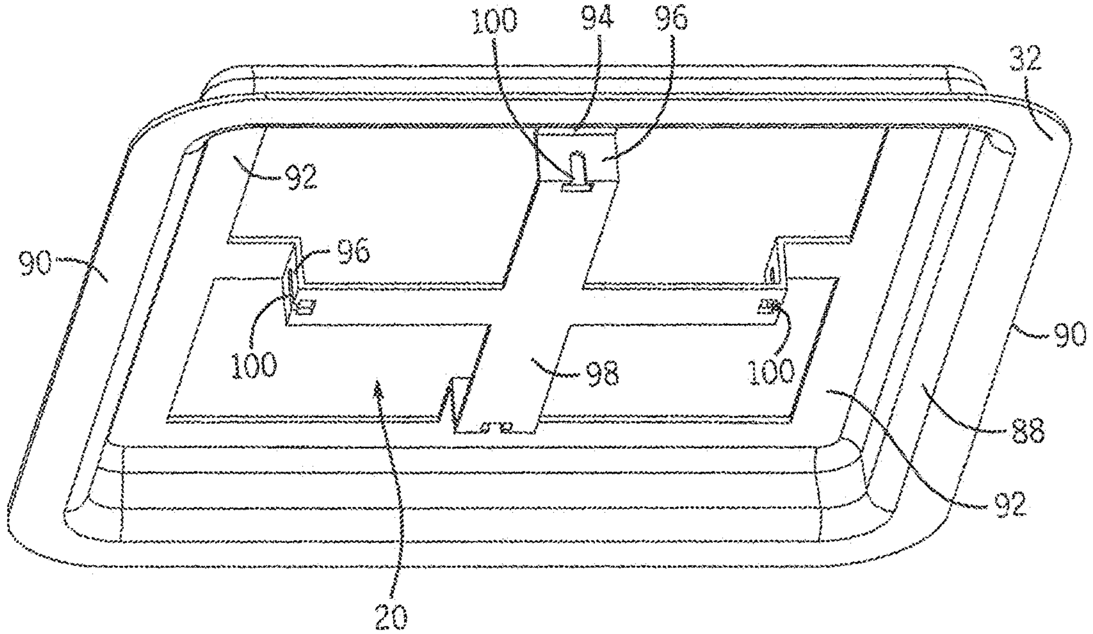
FIG. 10B is a front perspective view of the grille of FIG. 10A.

As shown in FIGS. 10A and 10B, in some embodiments, the grille 32 can comprise different configurations. In some embodiments, the grille 32 can comprise a support frame 81 and at least one support flange 84. In some embodiments, the grille 32 can comprise a plurality of support flanges 84. In some embodiments, at least a portion of the support flanges

84 can be coupled to the support frame 81 using any of the previously mentioned coupling techniques. In some embodiments, at least a portion of the support flanges 84 can be substantially integral with the support frame 81. For example, in some embodiments, the grille 32 can comprise a single sheet of metal and the support frame 81 and support flanges 84 can be stamped so that the grille 32 comprises a desired configuration. Moreover, in some embodiments, the grille 32 can be formed in a mold so that support frame 81 and at least some of the support flanges 84 are generally integrally formed.

As previously mentioned, the grille 32 can be coupled to the main housing 12 in a number of different ways. For example, in some embodiments, the support frame 81 can comprise at least one clip 86, as shown in FIG. 10A. In some embodiments, the support frame 81 can comprise a plurality of clips 86 that can be positioned around an outer perimeter of the grille 32. By way of example only, in some embodiments, the grille 32 can comprise a substantially square shape and the clips 86 can be positioned on two of the four sides of the grille 32. Although, in other embodiments, the grille 32 can comprise other shapes, such as, but not limited to square, rectangular, regular or irregular polygonal, any shape generally corresponding to the main housing 12, etc. In some embodiments, the clips 86 can be configured and arranged to engage elements of the main housing 12 (not shown) to couple the grille 32 to a portion of the main housing 12. In some embodiments, the clips 86 can also support the grille 32.

In some embodiments, the support frame 81 can comprise a plurality of walls 88, an upper flange 90, and a lower flange 92. Referring to FIGS. 10A and 10B, in some embodiments, the walls 88 can define a perimeter of the grille 32 and the upper flange 90 can be coupled to the walls 88 in any of the previously mentioned coupling manners. In some embodiments, the upper flange 90 can be substantially integral with the walls 88 (e.g., the flange 90 and the walls 88 are formed as a substantially integral element). In some embodiments, upper flange 90 can laterally extend from a portion of the walls 88 and, during assembly, can engage a portion of the main housing 12 to at least partially provide support for the grille 32.

In some embodiments, the lower flange 92 can extend from a portion of the walls 88 substantially opposite the upper flange 90. Moreover, in some embodiments, the lower flange 92 can at least partially define the aperture 20. For example, as shown in FIGS. 10A and 10B, in some embodiments, the lower flange 92 can extend in a lateral direction substantially opposite from the upper flange 90 and the aperture 20 can be disposed between portions of the lower flange 92.

Moreover, in some embodiments, the support flanges 84 can at least partially extend into a portion of the aperture 20 from the lower flange 92. In some embodiments, the support flanges 84 can extend from the lower flange 92 in multiple locations. As shown in FIGS. 10A and 10B, for example, in some embodiments, the lower flange 92 can comprise a substantially square configuration and the support flanges 84 can extend from each of the sides of the square. Although, in other embodiments, the lower flange 92 can comprise other shapes, and, the support flanges 84 can extend in different manners to at least partially correspond to the shape of the lower flange 92.

In some embodiments, at least a portion of the support flanges 84 can comprise different sections. For example, in some embodiments, the support flanges 84 can comprise different planes. As shown in FIGS. 10A and 10B, in some embodiments, a first region 94 of at least portion of at least some of the support flanges 84 can linearly extend from the lower flange 92 so that the support flange 84 and the lower flange 92 are in substantially the same plane. In some embodiments, as the support flanges 84 extend toward a center of the grille 32, the support flanges 84 can extend to a different plane. For example, as shown in FIGS. 10A and 10B, in some embodiments, the support flanges 84 can comprise a second region 96 that is oriented substantially parallel to at least a portion of the walls 88. In some embodiments, the second region 96 can extend away (e.g. up, down, and/or angled) from the first region 94. Moreover, in some embodiments, at least some of the second regions 96 can be at least partially angled and need not be substantially linear. In some embodiments, at least some of the support flanges 84 can comprise a third region 98 extending from the second region 96. In some embodiments, the third region 98 can lie in different plane relative to the first region 94, but, in some embodiments, the third region 98 can be substantially parallel to the first region 94. As shown in FIGS. 10A and 10B, in some embodiments, the third region 98 can lie in a plane substantially above the first region, however, in some embodiments, the third region 98 can lie in plane substantially below or substantially congruent to the plane of the first region 94.

Referring to FIGS. 2 and 3, in some embodiments, portions of the grille 32 adjacent to the region 38, which can define the plurality of apertures 20, can include a substantially curved area. Substantially curved can include arched, arced, angled, bent, bowed, curled, rounded, warped, or any other deviation from substantially planar. In other embodiments, the portions of the grille 32 which can define the plurality of apertures 20 can be substantially planar.

According to some embodiments, the region 38 can be located in a generally central area of the grille 32. In other embodiments, the region 38 can be located generally anywhere on the grille 32. In yet other embodiments, the region 38 can include multiple regions 38 located in either generally central areas of the grille 32 or anywhere on the grille 32. In some embodiments, the region 38 can take a generally annular shape. In other embodiments, the region 38 can take other shapes, including square, rectangular, polygonal, spherical, elliptical, or any other shape.

In some embodiments of the invention, the region 38 can include a horizontal plane and the grille 32 can include a horizontal plane. In some embodiments, the horizontal plane of the region 38 can be substantially parallel to the horizontal plane of the grille 32, but the two horizontal planes need not be congruent. More specifically, in some embodiments, the region 38 can be generally elevated with respect to the grille 32. In other embodiments, the region 38 can be generally recessed with respect to the grille 32. In other embodiments, the horizontal planes of both the grille 32 and the region 38 can be substantially congruent so that the entire grille 32 can be generally planar.

As shown in FIG. 2, in some embodiments, the portions of the grille 32 which can include the substantially curved area can be curved in a direction so that the grille 32 and the region 38 can contact each other. In some embodiments where the region 38 can be elevated with respect to the grille 32, the substantially curved area can curve in a generally upward direction so that the region 38 and the grille 32 can contact each other. More specifically, the region 38 can reside as a plateau connected to the grille 32, but on a different horizontal plane with the substantially curved area included between the two elements. In some embodiments where the region 38 can be recessed with respect to the grille 32, the substantially curved area can curve in a generally downward direction so that the region 38 and the grille 32 can contact each other. In other embodiments, the substantially curved area can be substantially planar so that the grille 32 and the region can be generally positioned in one horizontal plane. In some embodiments, the grille 32 and the region 38 can both be formed in one unit so that the grille 32 and the region 32 are integral. In some embodiments, the grille 32 and the region 32 can be formed from at least two different subunits and coupled together. The grille 32 and the region 32 can be coupled using any of the methods described above.

Referring to FIG. 3, in some embodiments of the invention, the region 38 can include a lamp aperture 40. The lamp aperture 40 can be defined in a generally central location within the region 38, in some embodiments. In other embodiments, the lamp aperture 40 can be defined anywhere within the region 38 or the grille 32. In some embodiments, the lamp aperture 40 can be generally annular, however the lamp aperture 40 also can be generally square, rectangular, polygonal, spherical, elliptical, or any other shape. In some embodiments the shape of the lamp aperture 40 can be selected based on the shape of the lamp housing 16.

In some embodiments, the lamp housing 16 can be shaped and dimensioned to be received by the lamp aperture 40. In some embodiments, the lamp housing 16 can include a heat-resistant material, heat shielding, and/or a reflective surface to inhibit heat from contacting various components of the system 10. In some embodiments, the reflective surface can generally direct light out the system 10. In some embodiments, the lamp aperture 40 can generally support, hold, or sustain the lamp housing 16. In some embodiments, the lamp aperture 40 can include a mounting flange 42 which can be used to support the lamp housing 16. The mounting flange 42 can be located substantially entirely around the inner diameter of the lamp aperture 40 and can be integral with the lamp aperture 40. In other embodiments, the mounting flange 42 can be a plurality of mounting flanges located around the inner diameter of the lamp aperture 40.

Figure 4:
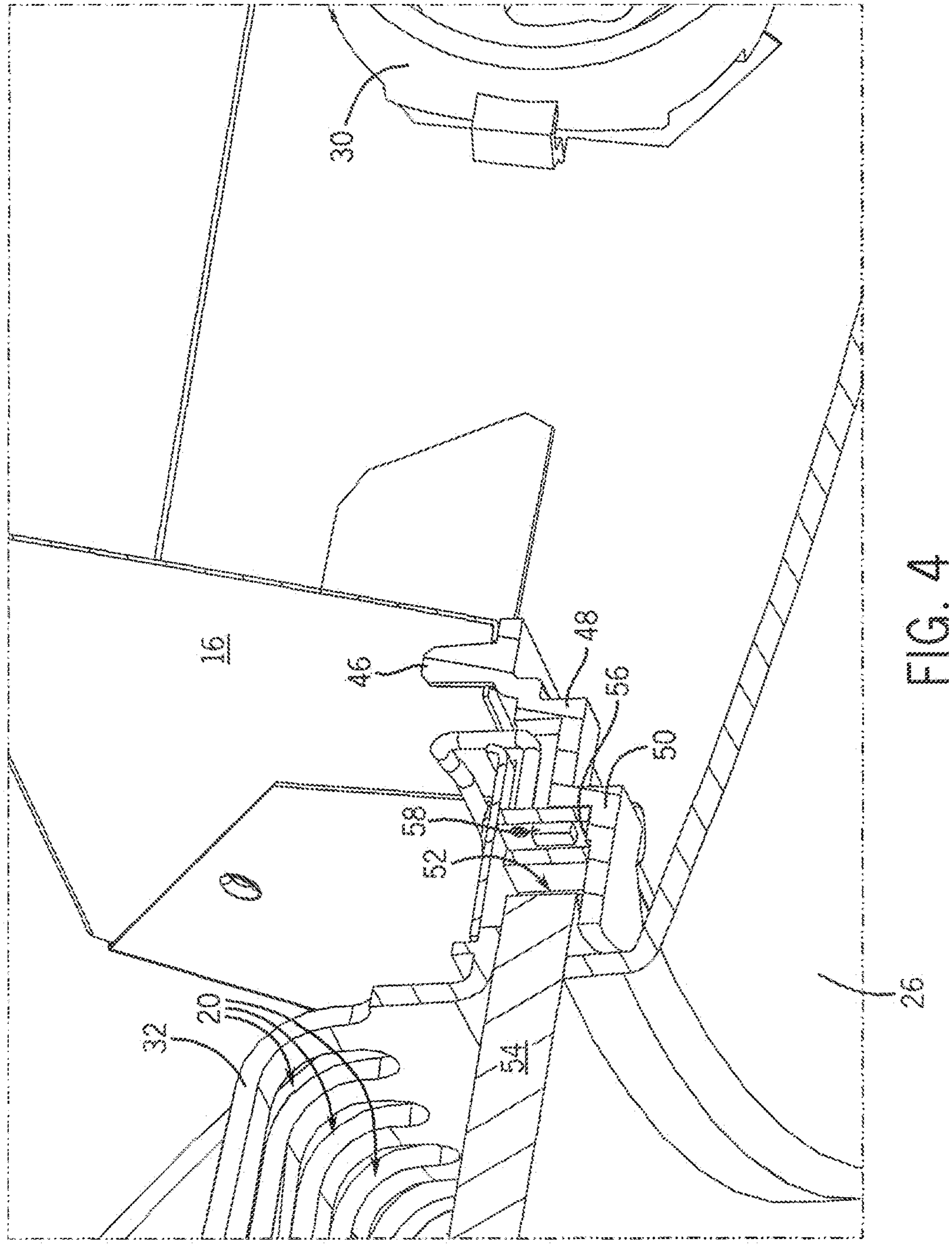
FIG. 4 is a cross section of a lighting and ventilating system according to one embodiment of the invention.

As shown in FIGS. 3-4, in some embodiments, the lamp housing 16 can be secured to the mounting flange 42 by one or more snap-fit features on the lamp housing 16 and/or the mounting flange 42. Additionally, in some embodiments, the one or more snap-fit features can be supplemented or largely replaced by any variety of coupling, such as screws, bolts, rivets, pins, clamps, glue or other adhesive, and any other similar fastener. In some embodiments, the lamp housing 16 and the mounting flange 42 can be further secured through other coupling practices such as welding, soldering, brazing, adhesive or cohesive bonding material, any combination of the foregoing, or any other similar coupling practice.

Referring to FIG. 3, in some embodiments, the lamp housing 16 can include one or more lips, flared edges, flanges, or other features to which the mounting flange 42 can be coupled. In some embodiments, the lamp housing 16 can include a second set of peripheral flanges 44 to which the mounting flange 42 can be attached. In some embodiments, the mounting flange 42 can include a set of pins 46 which can be received by a set of apertures included on the second set of peripheral flanges 44. In some embodiments, the connection between the pins 46 and the apertures of the flanges 44 can be further secured using any of the previously mentioned coupling methods. Further, in some embodiments, the mounting flange 42 and the lamp housing 16 can include apertures through which any of the above-discussed fasteners I couplers can be passed to secure the mounting flange 42 to the lamp housing 16. In some embodiments, the lamp housing 16 can be directly coupled to the region 38 and/or the grille 32 in any suitable manner. Further, in some embodiments, the lamp housing 16 can be directly coupled to the main housing 12 in any suitable manner.

In some embodiments, the lamp housing 16 can include the electrical sockets 30 and the first set of illumination devices 18, although some embodiments can include only one electrical socket 30 and one illumination device 18. In some embodiments, the electrical sockets 30 can be connected to the electrical components. The illumination devices 18 can contact the electric sockets 30, and, in some embodiments, when activated by the user, the illumination devices 18 can provide illumination to the room, area, or space. In some embodiments, the illumination devices 18 can include incandescent, fluorescent, compact fluorescent, halogen, and other lights and lamps. Further, these lights can be flood lights, globe lights, light-emitting diodes (LEDs), or other similar lighting apparatuses, including a combination of any of the above.

Referring to FIGS. 2-3, in some embodiments, the illumination devices 18 can be configured to operate separately from one another. In some embodiments, a first set of illumination devices 18 can be configured to emit either a brighter or duller light than the remainder of the first set of illumination devices 18. Also, in some embodiments, the illumination devices 18 can be configured in any conventional manner to have one or more dimmed settings or can be controllable in a range of brightness.

In some embodiments, the region 38 can include a set of step members 48. In some embodiments, the set of step members 48 can be one step member 48, however, some embodiments the set of step members 48 can be more than one step member 48, such as four step members 48. In some embodiments, the step members 48 can outwardly extend from the region 38. In some embodiments, the step members 48 can outwardly extend directly from the grille 32. The step members 48 can take a generally rectangular form in some embodiments, although in some embodiments, the step members 48 can take other forms, including square, oval, polygonal, elliptical, or any other shape. In some embodiments, the step members 48 can be integral with the region 38 or the grille 32. In some embodiments, the step members 48 can be separate subunits of the system 10 and can be coupled to the region 38 or the grille 32 in any suitable manner.

As illustrated in FIGS. 3 and 4, in some embodiments, the step members 48 can include a support flange 50, although not all step members 48 included in the system 10 need to include a support flange 50. In some embodiments, the support flange 50 can be positioned on each step member 48 at an end which generally can be the most radially distal relative to the region 38. In some embodiments, the support flange 50 can be positioned anywhere along the length of the step members 48. In some embodiments, the support flange 50 can be integral with the step members 48, however, in other embodiments, the support flange 50 can be coupled to the step members 48 in any suitable manner, which can include using any of the coupling techniques described above.

Referring now to FIG. 4, in some embodiments, each of the step members 48 can include a support slot 52. The support slot 52 can be defined by an area along a surface of the step members 48 near the support flange 50. In some embodiments, the support slot 52 can be sized to support a plate 54, as described in further detail below.

The support slot 52 and the support flange 50 together can, at least partially, enable installation of the plate 54 onto the system 10. In some embodiments, the support slot 52 can be any size which can be coordinated with any functionality the user and/or manufacturer desires. In other embodiments, the plate 54 can be installed by any other suitable methods and the support slots 52 can be absent.

Referring to FIG. 4, in some embodiments, an area of each of the step members 48 adjacent to the support slots 52 can include an illumination aperture 56. In some embodiments, the illumination apertures 56 can be located relatively centrally with respect to the support slots 52, however, in other embodiments, the illumination apertures 56 can be located anywhere within the support slots 52. In 25 other embodiments, the illumination apertures 56 can be located anywhere along the step members 48. In some embodiments, there can be any number of illumination apertures 56 on the system 10, including one per step member 48, two per step member 48, three per step member 48, and so forth. Further, in some embodiments, some or all of the step members 48 can lack illumination apertures 56.

In some embodiments, the illumination apertures 56 can contain electrical connections which can be used to provide power to a second set of illumination devices 58. The electrical connections can be positioned substantially within the step members 48. More specifically, in some embodiments, the step members 48 can be at least partially hollow or the step members 48 can contain a recess within them. In some embodiments, the electrical connections can be positioned within the hollow area of the step members 48. In some embodiments, the electrical connections can be part of a larger network of electrical components which can be connected to a user interface which the user can use to control the system 10. In some embodiments, the step members 48 can be substantially solid (i.e., substantially lacking any hollow areas) and the electrical connections can be positioned elsewhere on the system 10.

In some embodiments, the illumination apertures 56 can include the second set of illumination devices 58. The second set of illumination devices 58 can be of any type suitable to illuminate a room, area, space, or can be used to illuminate the plate 54. In some embodiments, the second set of illumination devices 58 can comprise LEDs, although, in some embodiments, the second set of illumination devices 58 can include incandescent, fluorescent, compact fluorescent, halogen, or any other type of illuminating apparatuses, including a combination of any of the above. In some embodiments, the number of illumination apertures 56 and the number of the second set of illumination devices 58 can be substantially the same (i.e., four illumination apertures and four illumination devices). In other embodiments, the number of illumination apertures 56 and the number of the second set of illumination devices 58 can be different, although in some embodiments, more than one illumination device 58 can be installed within one illumination aperture 56. Further, one or more of the second set of illumination devices 58 can be configured in any conventional manner to have one or more dimmed settings or to be controllable in a range of brightness.

Figure 8:
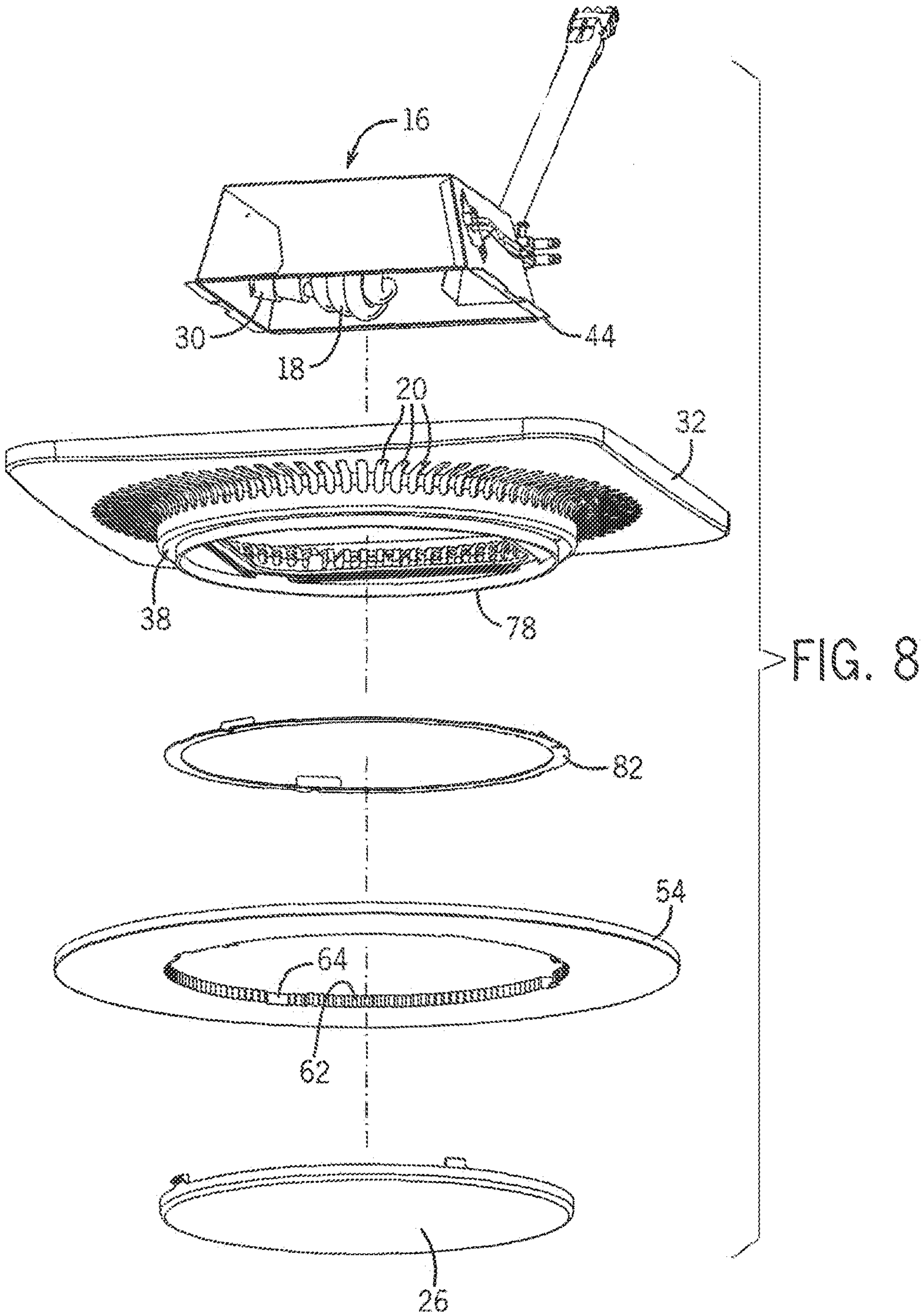
FIG. 8 is an exploded view of a lighting and ventilating system according to one embodiment of the invention.

Referring to FIG. 8, in some embodiments, the second set of illumination devices 58 can comprise a lighting strip or ribbon 82. In some embodiments, the step members 48, or an annular structure 78 that can be generally positioned on or in the grille 32 or region 38, can support the ribbon 82 to provide more even lighting about the periphery of a portion of the region 38 or the grille 32. In some embodiments, the ribbon 82 can comprise incandescent, fluorescent, compact fluorescent, halogen, and other lights and lamps. Further, the ribbon 82 can comprise flood lights, globe lights, LEDs, or other similar lighting apparatuses, including a combination of any of the above. In some embodiments, electrical connections can be coupled to the ribbon 82 so that the ribbon 82 can receive power. In some embodiments, the electrical connections can be part of a larger network of electrical components that can be connected to a user interface which the user can use to control the system 10.

In some embodiments of the invention, the second set of illumination devices 58 can be configured to operate independently of the first set of illumination devices 18. In some embodiments, the second set of illumination devices 58 can be configured to substantially automatically emit illumination when the area around the system 10 substantially lacks illumination (e.g., operate as a "night light"). In some embodiments, the second set of illumination devices 58 can be configured to emit illumination at the command of the user. The command of the user can include the user manually activating the second set of illumination devices 58, the user pre-programming automatic activation of the second set of illumination devices 58, the user pre-selecting times of the day for activation of the second set of illumination devices 58, or any other user-based commands. In some embodiments, both the first set 18 and the second set of illumination devices 58 can be configured to illuminate substantially the same space at substantially the same time.

Referring to FIG. 2, in some embodiments, the second set of illumination devices 58 can be configured to operate in cooperation with the first set of illumination devices 18. In some embodiments, the first set 18 and the second set of illumination devices 58 can be configured to be, at least partially, controlled by a motion-sensing monitor. In some embodiments, the motion sensing monitor can activate the first set of illumination devices 18 when it detects any general movement and the monitor can activate the second set of illumination devices 58 after no movement is detected for any chosen duration. In some embodiments, the motion-sensing monitor can deactivate the first set of illumination devices 18 when it activates the second set of illumination devices 58, and vice versa. Further, in some embodiments, the second set of illumination devices can be activated and the first set of illumination devices 18 can be deactivated when the space is generally unoccupied by a user and the space generally lacks other illumination. Conversely, the second set of illumination devices 58 can be deactivated and the first set of illumination devices 18 can be activated when the space is generally occupied by the user.

In some embodiments, the second set of illumination devices 58 can comprise other methods of operation. For example, in some embodiments, the second set of illumination devices 58 can emit a dynamic illumination event. In some embodiments, upon triggering of the dynamic illumination event, the second set of illumination devices 58 generally can receive gradually increasing amounts of current, via the electrical connections, so that the intensity of the illumination emitted by the second set of illumination devices 58 can generally increase at approximately the same rate as the increase in current. The increase in illumination intensity can occur over a broad range of intensities and increments so that the space into which the system 10 is installed can gradually go from a general lack of illumination through gradually increasing intensities of illumination until the second set of illumination devices 58 emit a maximum amount of illumination. In some embodiments, a microprocessor (not shown) can control the gradual increase in current to the second set of illumination devices 58. Further, in some embodiments of the invention, the gradual increase can be provided by different power modulation techniques, including pulse-width modulation.

Additionally, in some embodiments, the rate of gradual increase in the amount of current to the second set of illumination devices 58 can comprise a generally constant ramp slope. For example, after activation, the gradual increase in current provided to the second set of illumination devices 58 can comprise a generally constant increase until the amount of current can reach the pre-programmed maximum and then the amount of current can comprise a generally constant current.

In some embodiments, the general increase in the amount of current can comprise a generally gradual onset ramp slope. More specifically, in some embodiments, after activation, the general increase in current can increase at a generally lesser rate at a point more temporally proximal to activation than a point more temporally distal from activation. For example, relatively soon after activation, the rate of increase can comprise a generally lesser rate of current increase relative to a point closer to the pre-programmed maximum. After reaching the preprogrammed maximum, the amount of current can comprise a generally constant current.

In some embodiments, deactivation of the dynamic illumination event can comprise a generally immediate loss of current to the second set of illumination devices 58. For example, deactivation can comprise a relatively immediate withdrawal of current provided to the second set of illumination devices 58. In some embodiments, deactivation can comprise a gradual decrease in current to the second set of illumination devices 58 so that the intensity of the second set of illumination devices generally correspondingly decreases until substantially less illumination radiates from the second set of illumination devices 58.

In some embodiments of the invention, the illumination emitted by the second set of illumination devices 58 during the dynamic illumination event can comprise a range of colored illumination. The color can be any color, include blue, green, purple, amber, or any other color. Further, in some embodiments, the range of colored illumination can include variations in hues of the same color. For example, if the colored illumination is blue, then color emitted by the second set of illumination devices 58 upon initial activation of the dynamic illumination event can be generally a darker hue of blue, and as the current increases, the color can become a generally lighter hue of blue.

Additionally, in some embodiments, the system IO can include the capability to emit more than one color. In some embodiments, the user can select which color he or she prefers for the dynamic illumination event from any color that the system 10 can display. In some embodiments, the system 10 can include four colors from which the user can chose, although in other embodiments, the system can include any number of colors that the manufacturer or user desires.

In some embodiments, the user can use a selection actuator (not shown) to select the color of the dynamic illumination event. In some embodiments, the selection actuator can be a dip switch, but in other embodiments, the selection actuator can be a rotary switch, or any other suitable device. In some embodiments, the selection actuator can be positioned substantially within the lamp housing 16, the main housing 12, the grille 32, or generally anywhere in or on the system 10, but in other embodiments, the selection actuator can be installed in a remote location.

In some embodiments, the second set of illumination devices 58 can provide illumination both when the user is and/or is not in the space to be illuminated. For example, in some embodiments, when the user is not present in the space to be illuminated, the second set of illumination devices 58 can emit a generally low-level intensity of illumination so that the system 10 can function as a night light, similar to some of the previously mentioned embodiments. In some embodiments, this can be mediated, at least partially by the motion sensing monitor (e.g. the system 10 can function as a night light when there is little to no movement in the space). Additionally, in some embodiments, the second set of illumination devices 56 can be controlled by a timer to determine when the low-intensity illumination should be emitted. In some embodiments, upon detecting the presence of the user (e.g., via the motion sensing monitor, a user-actuated switch, and/or a timer), the second set of illumination devices 58 can emit the dynamic illumination event or can substantially immediately begin emitting a greater intensity illumination so that at least a portion of the room is substantially illuminated (e.g., the system 10 can provide both quiescent and/or task illumination). In some embodiments, the system can include the plate 54. In some embodiments, the plate 54 can be formed from glass, acrylic, injection-molded polymers, or any other similar material. In some embodiments, the plate can be formed such that it is substantially transparent. In other embodiments, the plate can be formed such that it can be substantially translucent, opaque, or any other light-transmissive state within the range of any of the above. Further, in some embodiments, the plate 54 can include different regions which can include different light-transmissive properties.

In some embodiments, the plate 54 can be generally colorless (i.e., lacking all tint). In other embodiments, the plate 54 can include a tint. Further, in some embodiments the tint color can include green, blue, red, orange, violet, yellow, or any other color or combination of colors (not shown).

In some embodiments, the plate 54 can be formed so that it can take a generally annular shape. In other embodiments, however, the plate 54 can take any shape, including, but not limited to a square, rectangle, polygon, ellipse, oval, or any other shape. Also, in some embodiments, the plate 54 can have a substantially irregular shape. In some embodiments, the plate 54 can be of a size substantially similar to the grille 32. In some embodiments, however, the plate 54 and the grille 32 can be of generally different sizes. The plate 54 can be either a larger size or a smaller size than the grille 32.

In some embodiments, the plate 54 can include a substantially non-textured or smooth surface. In other embodiments, the plate 54 can include a non-homogenous surface so that the surface of the plate 54 can be, at least partially, textured. In some embodiments, the plate 54 can be manufactured as a single unit. In some embodiments, the plate 54 can be manufactured as multiple units and those multiple units can be coupled using any one or combination of the coupling techniques discussed above.

Figure 6:
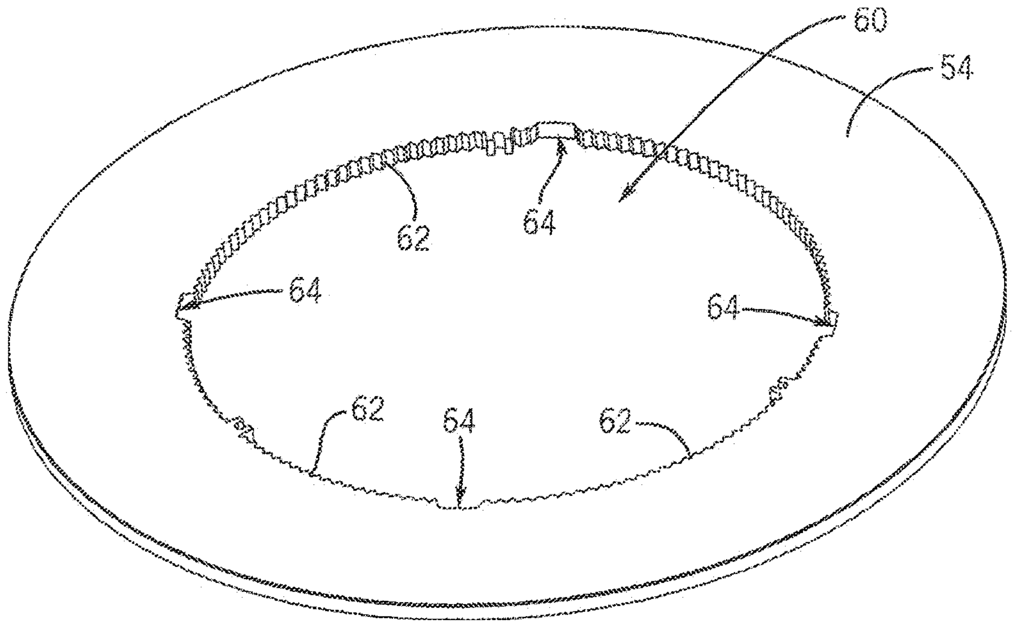
FIG. 6 is a perspective view of a lighting and ventilating system according to one embodiment of the invention.

Referring to FIGS. 3 and 6, according to some embodiments of the invention, the plate 54 can include a plate aperture 60. In some embodiments, the plate aperture 60 can be located substantially centrally on the plate 54. In other embodiments, the plate aperture 60 can be located anywhere along the plate 54. In some embodiments, the plate aperture 60 can take a generally annular shape so that, with inclusion of the plate aperture 60 in a generally annular-shaped plate 54, the plate 54 can take a generally ring-shaped appearance. In other embodiments, the plate aperture 60 can take any other regular or irregular shape.

In some embodiments, walls of the plate aperture 60 can include a generally smooth, non-textured surface. As seen in FIG. 6, in other embodiments, the walls of the plate aperture 60 can include a generally textured surface 62. In some embodiments, the textured surface 62 can include a generally saw-toothed texture, as can be seen in FIG. 6. In some embodiments, the textured surface 62 can substantially extend around the entire circumference of the plate aperture 60. In some embodiments, the textured surface 62 can be localized only to some regions of the walls of the plate aperture 60, as shown in FIG. 2. The textured surface can help to diffuse light and provide a more even illumination pattern in some embodiments 10 of the invention.

In some embodiments, the walls of the plate aperture 60 can include a set of mounting notches 64. In some embodiments, the set of mounting notches 64 can be of a generally semicircular shape, although in other embodiments the set of mounting notches 64 can be a shape that is generally square, rectangular, elliptical, oval, or any other regular or irregular shape. In some embodiments, the set of mounting notches 64 can be substantially equidistantly spaced around the circumference of the plate aperture 60, although in other embodiments, the set of mounting notches 64 can be spaced in any manner desired. In some embodiments, the number of the set of mounting notches 64 can be the same as the number of step 20 members 48. In other embodiments, the numbers of mounting notches 64 and step members 48 can be different.

Referring to FIG. 2, in some embodiments, the set of mounting notches 64 can be used to couple the plate 54 to the grille 32. In some embodiments, the plate 54 can be positioned so that each of the support flanges 50 substantially align with an area generally adjacent to each of the mounting notches 64. In some embodiments, once aligned, the plate 54 can be moved so that the plate 54 moves with respect to the support flanges 50. In some embodiments, once the mounting notches 64 are moved away from the support flanges 50, the plate 54 can now be largely supported by the support flanges 50 and the support slots 52. In some embodiments, the movement of the plate 54 can be a rotation, twist, revolving, or other similar movement.

Figure 11A:
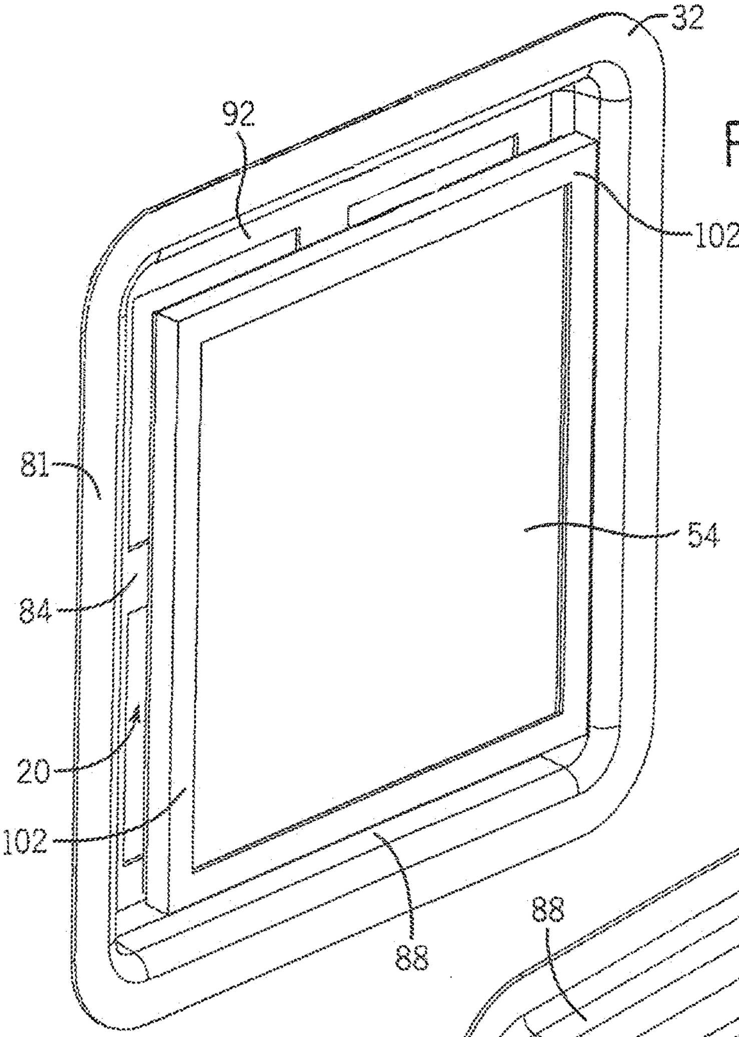
FIG. 11A is a front perspective view of a portion of the lighting and ventilating system of FIG. 9.
Figure 11B:
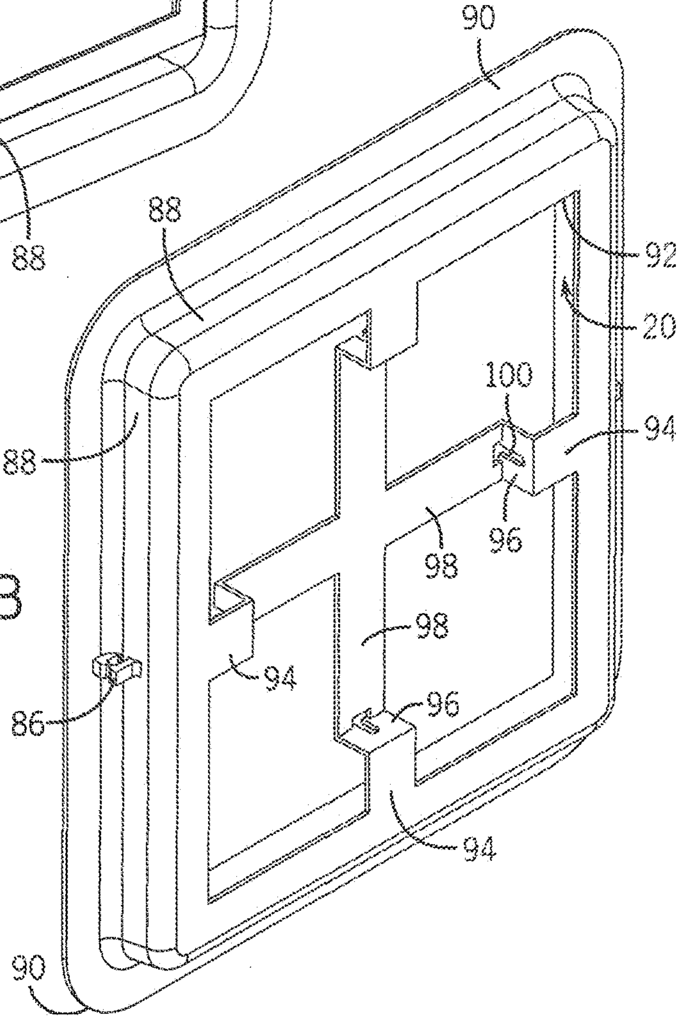
FIG. 11B is a rear perspective view of the portion of FIG. 11A.

In some embodiments, the plate 54 can be coupled to the grille 32 in other manners. As shown in FIGS. 11A and 11B, in some embodiments, the plate 54 can be coupled to the support flanges 84. In some embodiments, at least some of the support flanges 84 comprise a plate coupling aperture 100 disposed through portions of the second region 96 and the third region 98, as shown in FIGS. 10A and 10B. In some embodiments, the coupling apertures 100 can function to couple the plate 54 to the grille 32 (e.g., the support flanges 84). For example, in some embodiments, at least some clips (not shown), which can be integral or coupled to the plate 54, can be used to couple the plate 54 to the coupling apertures 100. In other embodiments, the plate 54 can be coupled to the grille 32 in any of the previously mentioned coupling manners. Moreover, in some embodiments, at least a portion of the plate 54 can be in a plane that is substantially congruent with a plane of the upper flange 90, as shown in FIGS. 9, 11A and 11B. In some embodiments, after coupling an air path can be defined between the plate 54 and the support frame 81 and support flanges 84 of the grille 32 so that air can flow into the housing 12 after passing between the plate 54 and the apertures 20 of the grille 32.

Figure 12:
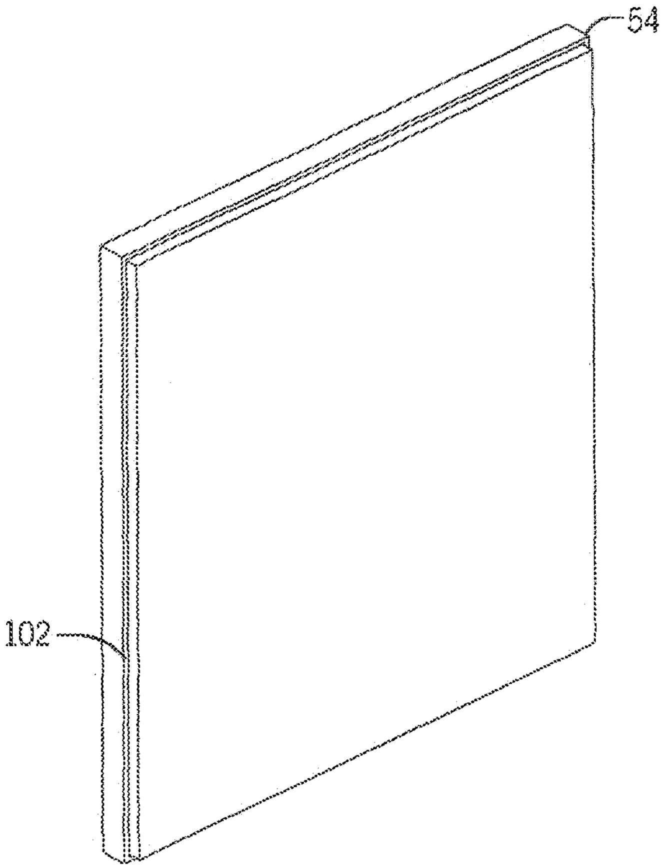
FIG. 12 is a perspective view of a plate according to one embodiment of the invention.

In some embodiments, the plate 54 can comprise other configurations. As shown in FIGS. 11A-12, in some embodiments, the plate 54 can comprise a recess 102 around at least a portion of an inner perimeter of the plate 54. For example, as shown in FIG. 12, in some embodiments, the recess 102 can be positioned substantially adjacent to an outer perimeter of the plate 54 (e.g., the recess 102 is almost at an edge of the plate 54). Although, in other embodiments, the recess 102 can be positioned in other locations on and/or through the plate 54.

In some embodiments, the recess 102 can comprise a shape substantially similar to the plate's 54 shape. For example, as shown in FIG. 12, in some embodiments, the plate 54 can comprise a substantially square shape and, accordingly, the recess 102 can comprise a substantially square shape. Moreover, as previously mentioned, in some embodiments, the plate 54 can comprise any number of shapes, and accordingly, the recess 102 can comprise any number of shapes. Furthermore, in some embodiments, the recess 102 need not comprise a shape similar to the plate 54. For example, the plate 54 can comprise a substantially square shape, and the recess 102 can comprise any other shape (e.g. annular).

In some embodiments, the recess 102 can comprise a groove, a notch, a depression, an indentation, etc. In some embodiments, at least a portion of the recess 102 can extend through an entire thickness of the plate 54. In some embodiments, the plate 54 can be formed with the recess 102, and in other embodiments, the recess 102 can be machined or otherwise disposed within the plate 54. Additionally, in some embodiments, at least a portion of an interior surface of the recess 102 can comprise the textured surface 62.

Figure 13:
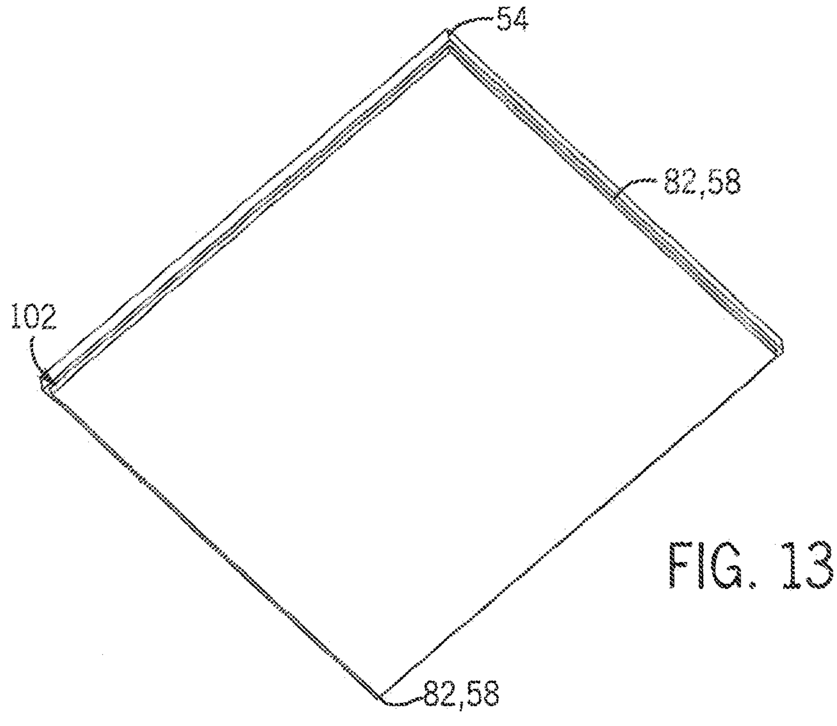
FIG. 13 is a perspective view of a plate and ribbon according to one embodiment of the invention.

In some embodiments, at least a portion of the second set of illumination devices 58 can be coupled to the plate 54. In some embodiments, the second set of illumination devices 58 can be coupled to the plate 54 using any of the previously mentioned coupling techniques, including disposing the devices 58 within at least a portion of the recess 102. For example, as shown in FIG. 13, in some embodiments, the ribbon 82 can be at least partially positioned within the recess 102. In some embodiments, the ribbon 82 can comprise any of the previously mentioned lighting configurations. In some embodiments, electrical connections can be coupled to the ribbon 82 so that the ribbon 82 can receive power. In some embodiments, the electrical connections can be part of a larger network of electrical components that can be connected to a user interface that the user can use to control the system 10. Additionally, in some embodiments, at least a portion of an interior surface of the recess 102 can comprise the textured surface 62, which can at least partially enhance illumination diffusion.

In some embodiments, the plate 54, the second set of illumination devices 58, and the recess 102 can be configured and arranged to direct illumination in multiple directions. In some embodiments, the second set of illuminations 58 can be disposed in the recess 102 so that that illumination is centrally directed, with respect to the plate 54. For example, in some embodiments, the second set of illumination devices 58 can be positioned so that their illumination is directed inward and diffuses through the plate 54, which can produce a generally illuminated plate 54. In some embodiments, the second set of illumination devices 58 can be disposed in the recess 102 in other manners so that their illumination is directed in substantially any direction desired by the manufacturer and/or end user.

Figure 14:
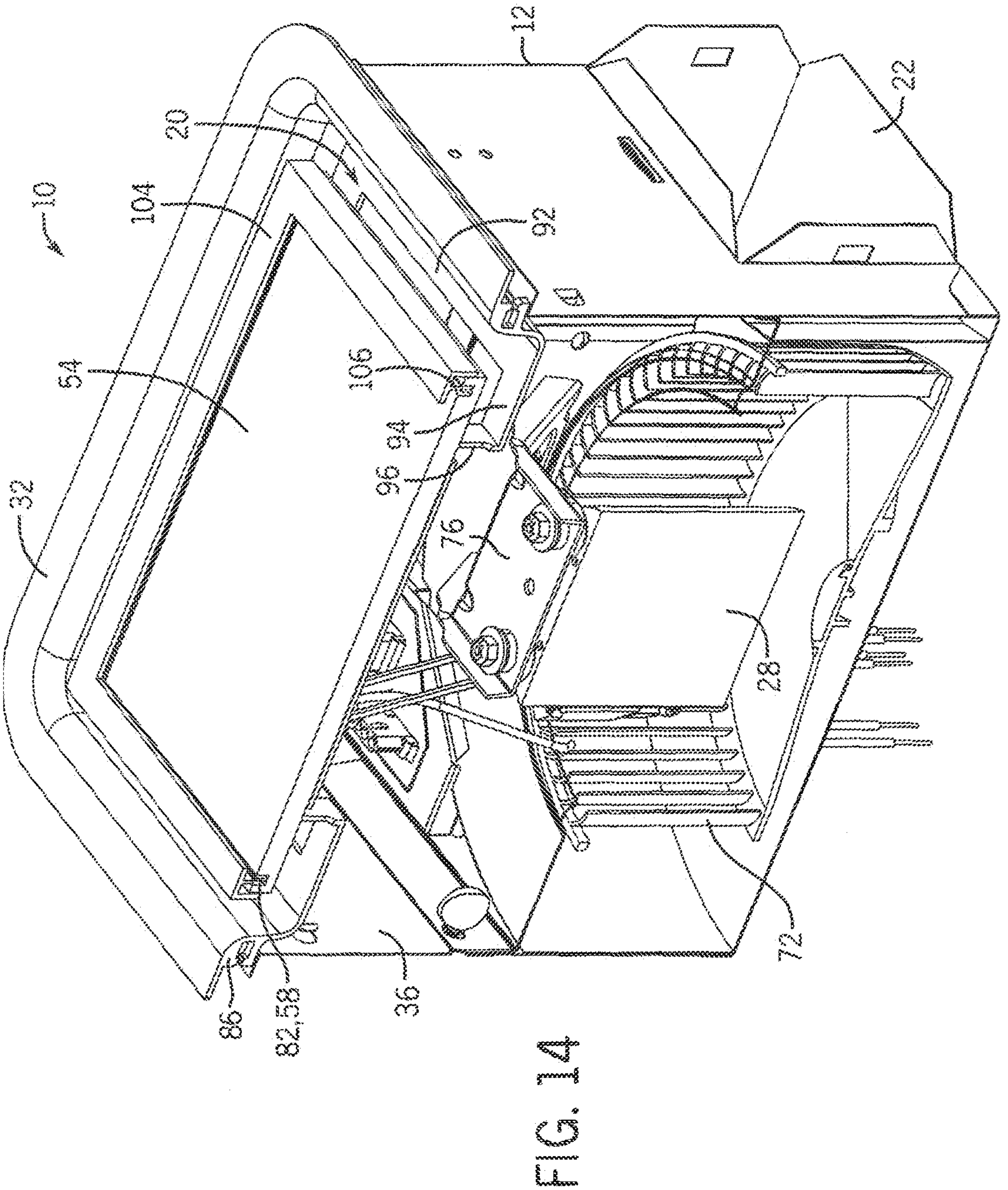
FIG. 14 is a cross-sectional view of the lighting and ventilating system of FIG. 9.
Figure 15:
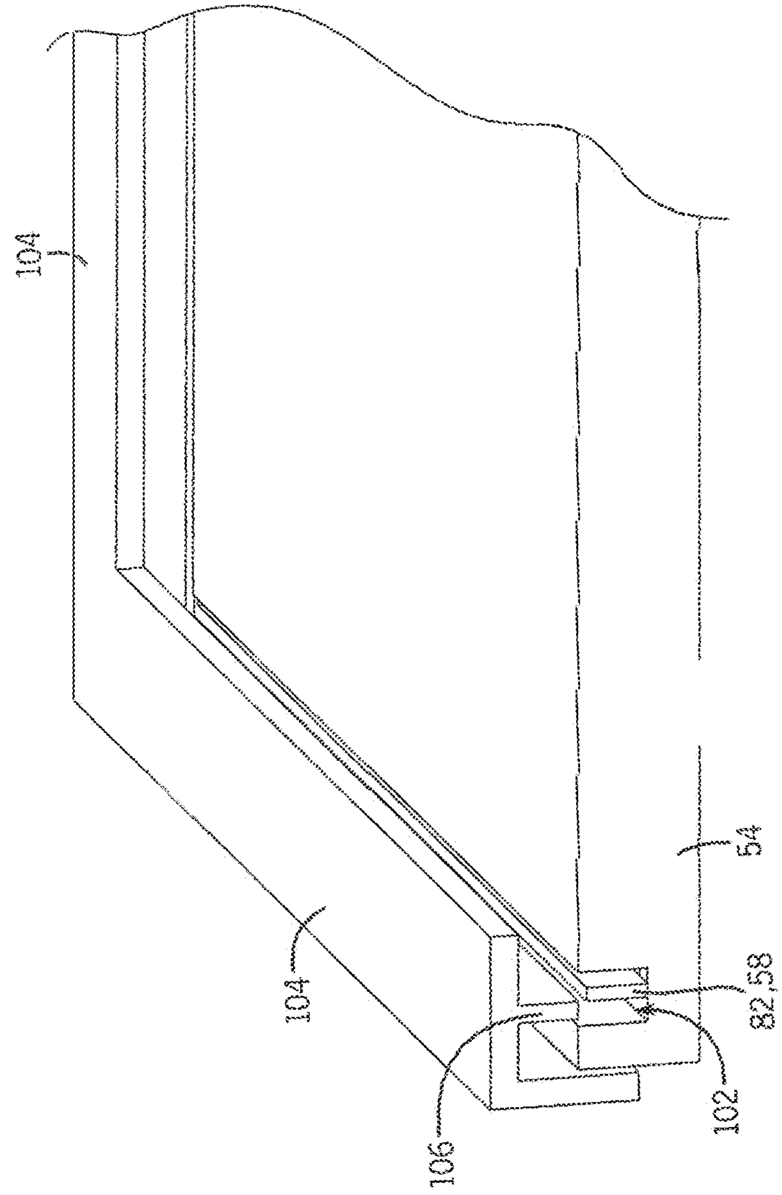
FIG. 15 is cross-sectional view of a portion of the lighting and ventilating system of FIG. 9.
Figure 16:
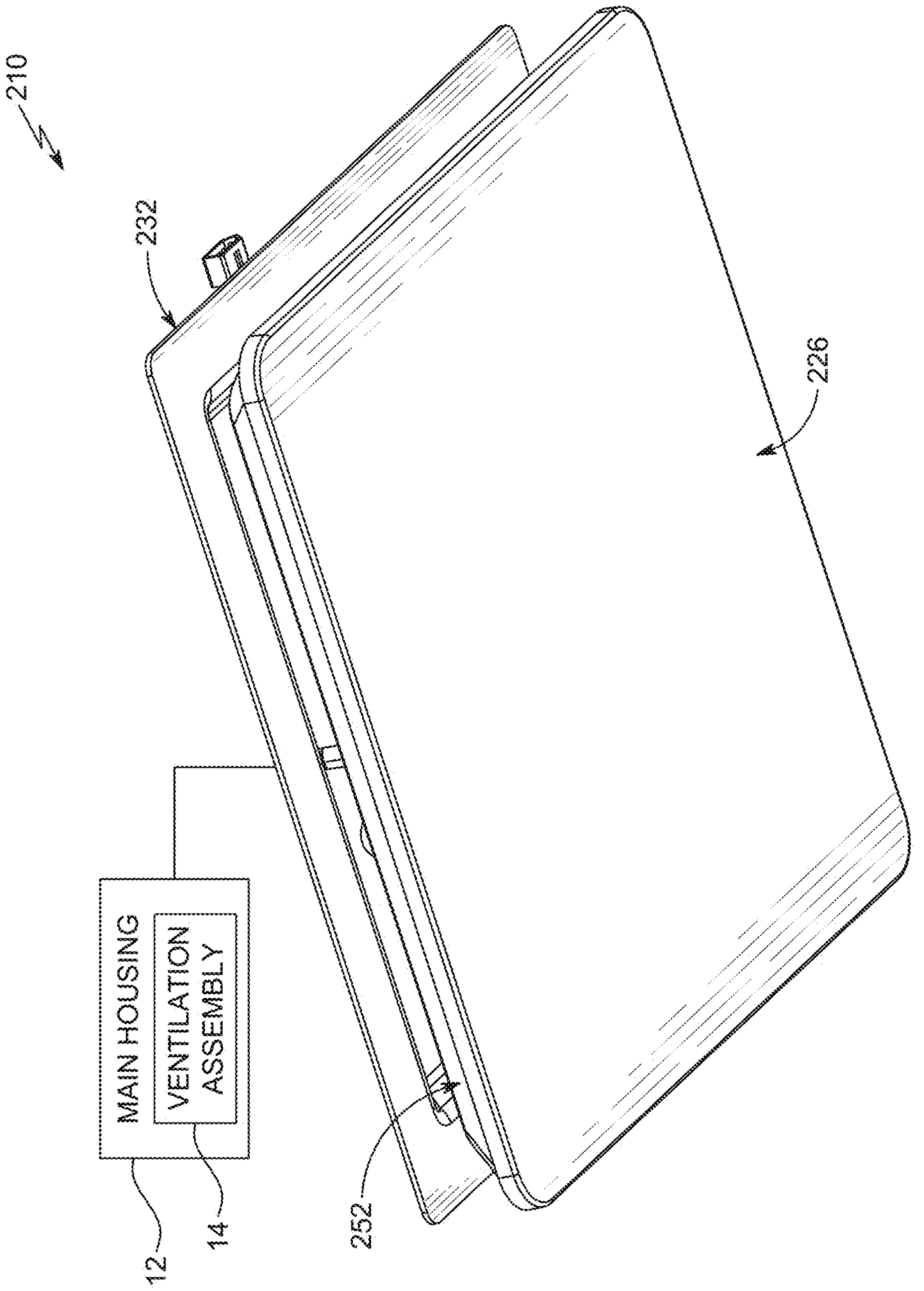
FIG. 16 is a perspective view of a portion of another lighting and ventilating system.

In some embodiments, a panel 104 can be coupled to the plate 54. In some embodiments, the panel 104 can comprise a substantially similar size and shape as the outer perimeter of the plate 54. For example, as shown in FIGS. 14 and 15, in some embodiments, the panel 104 can comprise a substantially square or rectangular shape to correspond to the similar shape of the outer perimeter of the plate 54. In some embodiments, the panel 104 can comprise a substantially single element, and in other embodiments, the panel 104 can comprise multiple elements coupled together to form the panel 104. Moreover, in some embodiments, the panel 104 need not comprise a size and shape substantially similar to the plate 54.

In some embodiments, the panel 104 can be coupled to the plate 54 via the recess 102. In some embodiments, the panel 104 can comprise a panel flange 106 that is configured and arranged to engage the recess 102. For example, in some embodiments, after positioning the second set of illumination devices 58 within the recess 102, at least a portion of the panel flange 106 can be positioned within the recess 102 to couple the panel 104 to the plate 54. In some embodiments, the panel 104 can be snap fit, interference fit, or coupled to the plate 54 via any other previously mentioned coupling techniques. In some embodiments, the panel 104 can be coupled to and surround the entire outer perimeter of the plate 54, however, in other embodiments, the panel 104 can be positioned around any lesser proportion of the plate 54.

In some embodiments, at least a portion of the panel flange 106 can be substantially immediately adjacent to the second set of illumination devices 58 within the recess 102. In some embodiments, a surface of the panel flange 106 immediately adjacent to the second set of illumination devices 58 can comprise a substantially reflective surface. As a result, in some embodiments, at least a portion of the illumination provided by the second set of illumination devices 58 can be centrally reflected by the reflective surface to improve illumination of the plate 54.

In some embodiments, as shown in FIGS. 3, 6, and 7, the plate 54 can include a set of illumination notches 66. In some embodiments, the illumination 5 notches 66 can be of a generally semi-circular shape, although in other embodiments the illumination notches 66 can be a shape that is generally square, rectangular, elliptical, oval, or any other regular or irregular shape. In some embodiments, the illumination notches 66 can be substantially equidistantly spaced around the circumference of the plate aperture 60, although in other embodiments, 10 the illumination notches 66 can be spaced in any manner desired. In some embodiments, the number of the illumination notches 66 can be the same as the number of step members 48. In other embodiments, the numbers of illumination notches 66 and step members 48 can be different. In some embodiments, some or all of the illumination notches 66 can include the textured surface 62, independently of whether the remainder of the walls of the plate aperture 60 includes the textured surface 62.

In some embodiments, after the plate 54 has been coupled to the grille 32, the illumination notches 66 can substantially align with the illumination apertures 56 and the second set of illumination devices 58. In some embodiments, when the second set of illumination devices 58 are activated, the illumination notches 66 can aid in dispersing illumination to the remainder of the plate 54 and to the local environment as well. In some embodiments, the textured surface 62, whether included in the illumination notches 66 or not, can further enhance illumination distribution to the plate 54 and the local environment relative to embodiments which can substantially lack the textured surface 62. Additionally, in some embodiments, the second set of illumination devices 58 can be positioned adjacent to a reflective surface so that after activation of the second set of illumination devices 58, the second set 58 can radiate illumination generally toward the reflective surface which can reflect a substantial amount of the illumination toward the plate 54.

In some embodiments, the plate 54 can include light pipes 68. In some embodiments, the light pipes 68 can be substantially internalized within the plate 54. In other embodiments, the light pipes 68 can be coupled to a surface of the plate 54. In some embodiments, the light pipes 68 can extend from an area adjacent to each of the illumination notches 66 to an area generally adjacent to an outer perimeter of the plate 54. In some embodiments, the light pipes 68 can extend any distance from the area adjacent to each of the illumination notches 66. The light pipes 60 can aid in conducting any illumination from the second set of illumination devices 58 to the outer perimeter of the plate 54 and to the local environment.

Referring to FIG. 3, in some embodiments, the grille 32 can include a pilot light 70. The pilot light 70 can be any of the above-discussed illumination devices. In some embodiments, the pilot light 70 can be configured to radiate illumination when the ventilating assembly 14 is in a substantially operative state. In some embodiments, the ventilating assembly 14 can produce so little noise that it can be difficult to substantially audibly perceive it is in the operative state. In some embodiments, when the pilot light 70 is illuminated, an additional signal that the ventilating assembly is operating can be perceived by the user. The pilot light 70 can aid in potentially preventing unintended overuse of the ventilating assembly 14. Additionally, in some embodiments, the pilot light 70 can provide substantially green illumination, but in other embodiments, the pilot light 70 can provide any other color of illumination that would be desirable by the user and/or manufacturer.

In some embodiments, at least one of the plate's 54 light pipes 68 can be substantially aligned with the pilot light 70 so that when the grille 32 is coupled to the plate 54, the light pipe 68 is substantially adjacent to the pilot light 70. In some embodiments, this light pipe 68 can aid in conducting the pilot light's 70 illumination from the grille 32 through the plate 54 which can lead to easier visualization by the user.

As illustrated in FIGS. 1 and 3, in some embodiments of the invention, the lens 26 can be coupled to the system 10. The lens 26 can aid in diffusing illumination emitted by either the first set 18 or the second set 58 of illumination devices. In some embodiments, the lens 26 can be coupled to the grille 32 and/or the plate 54 by any of a number of the above-discussed coupling techniques, including snap-fitting, fasteners, or adhesives. Alternatively, the lens 26 can be integrally formed with either the grille 32 and/or the plate 54.

Figure 5:
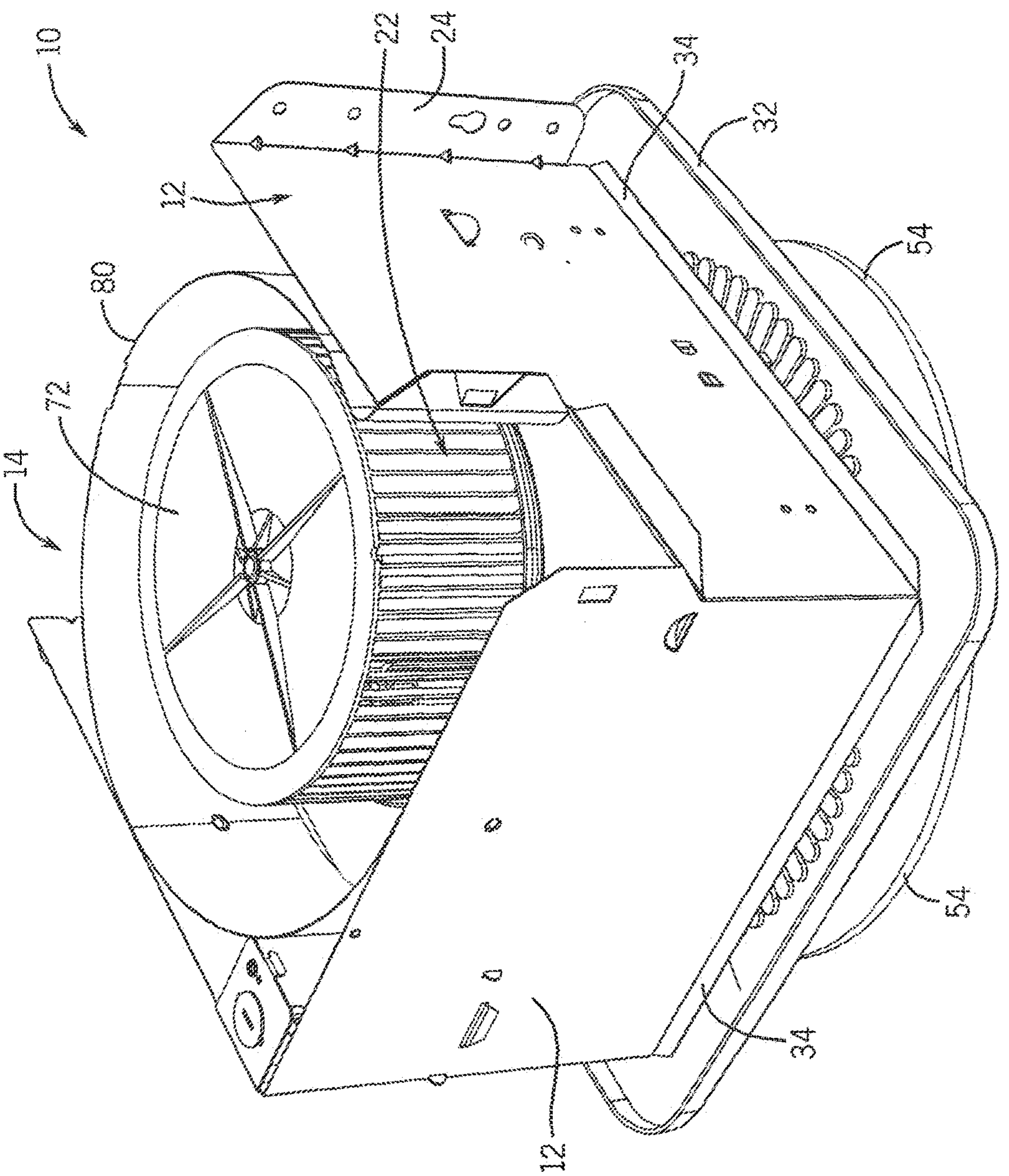
FIG. 5 is a perspective view of a plate according to one embodiment of the invention.

Referring to FIGS. 5 and 7, in some embodiments of the invention, the ventilating assembly 14 can include a centrifugal fan or fan wheel 72 connected to a motor plate 74 or other structure within the main housing 12. In some embodiments, any other type of fan other than a centrifugal or fan wheel 72 can be employed, including propeller-type fans.

In some embodiments, the system 10 can include the motor 28 connected to the motor plate 74 by a bracket 76. The motor 28 can include a motor shaft, which can extend through the bracket 76 and/or the motor plate 74 to produce ventilating airflow. In some embodiments, the ventilating assembly 14 can be removably connected within the main housing 14 as a single integral unit.

In some embodiments, when the ventilating assembly 14 is installed within the main housing 12, the fan 72 can be supported adjacent to an arcuate, upstanding wall 80. Together with a bottom wall of the main housing 12 and the motor plate 74, the upstanding wall 80 can define a scroll housing for generating airflow. In some embodiments, the fan wheel 72 can be positioned relative to the upstanding wall 80 to form a scroll inlet to receive air through the apertures 20, and a scroll outlet to discharge air out of the ventilating outlet 22. For example, in some embodiments, a flow of air can flow around the plate 54 and enter the main housing 12 through the aperture 20 defined by the lower flange 92.

In some embodiments, one or more power consuming devices, including, but 25 not limited to the motor 28, the first and second set of illumination devices 18, 58, and the pilot light 70 can be powered by an internal electrical circuit of a building. In some embodiments, one common line from one side of the main housing 12 can provide an inlet for one or more lines of power to enter the main housing 12 and power one or more of the power-consuming devices.

In some embodiments, one or more switches, such as wall switches can be used to activate or deactivate any of the power-consuming devices. In some embodiments, three separate switches can be used to control the ventilating assembly 14, the first set of illumination devices 18, and the second set of illumination devices 58. In some embodiments, one switch can be used to control all three. Further, in some embodiments, as discussed above, the motion-sensing monitor can be used to control any of the ventilating assembly 14, the first set of illumination devices 18, and the second set of illumination devices 58.

FIGS. 16-22 illustrate a portion of a lighting and ventilating system 210 according to another embodiment of the present disclosure. Some embodiments of the system 10 can include several components and devices that can perform various functions. In some embodiments of the present invention, the system 210 can include the main housing 12 and ventilating assembly 14 of one of the previously described lighting and ventilating systems 10, which can house components of the system 10.

The system 210 generally can further include a first set of illumination devices 218, a lens 226, a grille 232, and a plate 252.

In some embodiments, the system 10 can be used to illuminate and/or ventilate any room, area, or space. In some embodiments, the system 10 can illuminate the room, area, or space independently of ventilating the room, area, or space. Further, in some embodiments, the system 10 can provide different intensities of illumination to the room, area, or space.

In some embodiments, the grille 232 can be coupled to the main housing 12. In some embodiments, the grille 232 can be formed in a generally square-like shape, although the grille 232 can take any shape, including an oval shape, a hemispherical shape, a spherical shape, a pyramidal shape, or any other shape. Further, in some embodiments, the grille 232 can be configured so that it substantially matches the shape of the main housing 12. The grille 232 can be formed from injection-molded polymers, injection-molded polycarbonate, sheet metal, or any other suitable material.

In some embodiments, the grille 232 can be positioned over an open end of the main housing 12. In some embodiments, the open end of the main housing 12 can be shaped and dimensioned to be received within an open end of the grille 232. The grille 232 can be secured to the main housing 12 by any variety of couplings, such as screws, grille springs, bolts, rivets, pins, clamps, glue or other adhesive, and any other similar coupling on the grille 232 and/or the main housing 12. Additionally, in some embodiments, the one or more snap-fit features can supplement or largely replace other types of couplings snap-fit features. In some embodiments, the main housing 12 and the grille 232 can be further secured through other coupling practices such as welding, soldering, brazing, adhesive or cohesive bonding material, any combination of the foregoing, or any other similar coupling practice.

In some embodiments, the grille 232 can include one or more apertures such as aperture 220. In some embodiments, the aperture 220 can extend across or align with an inlet defined by the main housing 12. The aperture 220 can be used for receiving a flow of air. In some embodiments, the location of the aperture 220 can be at least partially determined by airflow path(s) which can be available from the aperture 220, through the inlet, and into the ventilating assembly 14. In the illustrative embodiment, a single aperture 220 is defined and the aperture 220 is located in a generally central region of the grille 232. In some embodiments, the location of the aperture 220 can be selected substantially based on aesthetics, functionality, and other considerations that can be important to a user and/or a manufacturer.

The grille 232 includes an inlet skirt 234, an inner shoulder 236 coupled to a lower end of the inlet skirt 234, and a perimeter frame 238 coupled to an outer edge of the inner shoulder 236. The inlet skirt 234 has a funnel shape and defines the aperture 220 leading into the main housing 12. The inner shoulder steps down from the lower end of the inlet skirt 234 to the perimeter frame 238. The perimeter frame 238 extends outwardly away from the inner shoulder 236 and may interface with the main housing 12 or a panel, such as a ceiling panel, of the room which the ventilating system 210 services.

Figure 17:
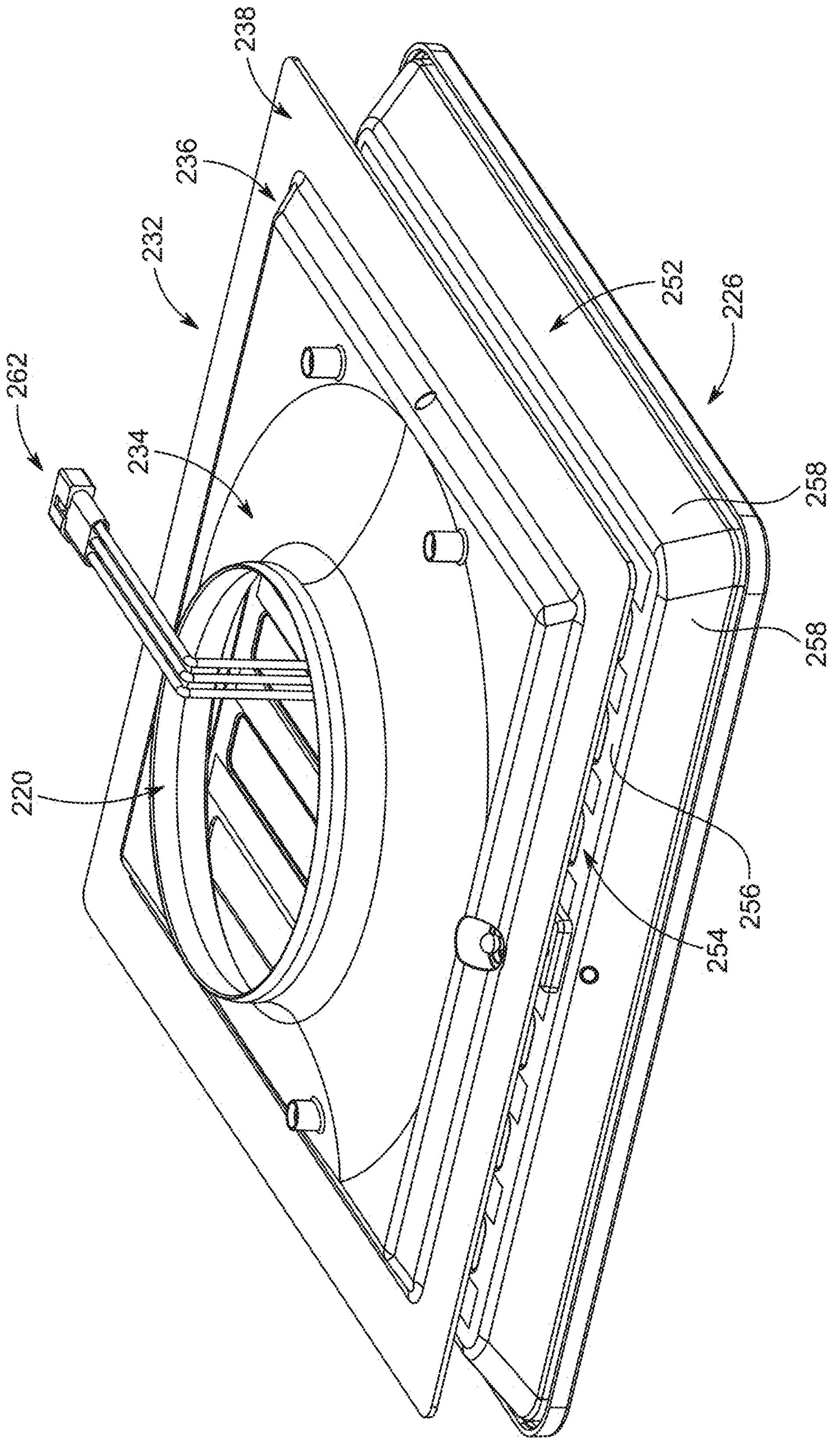
FIG. 17 is another perspective view of the portion of the lighting and ventilating system of FIG. 16.
Figure 18:
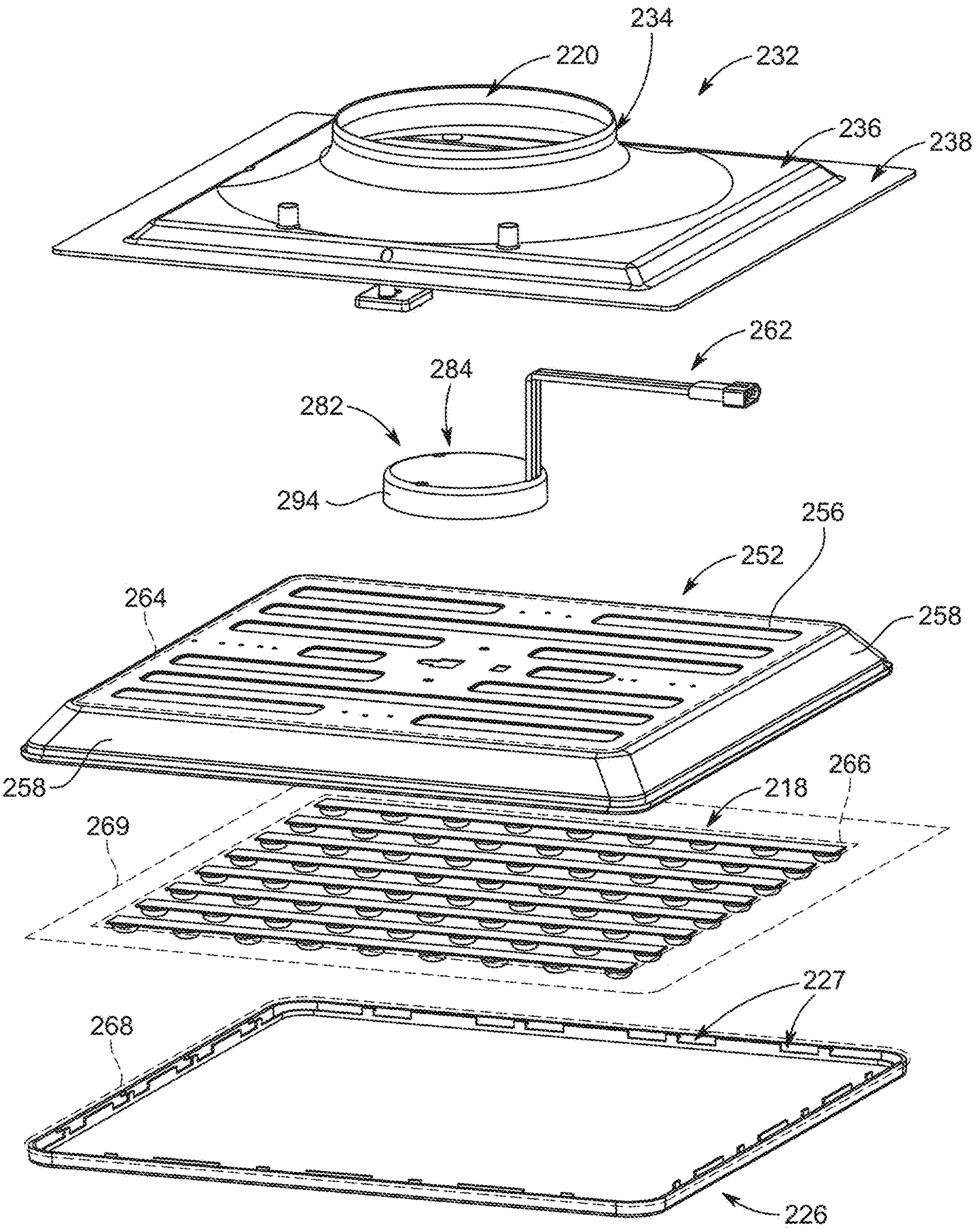
FIG. 18 is an exploded assembly view of the portion of the lighting and ventilating system of FIG. 16.
Figure 19:
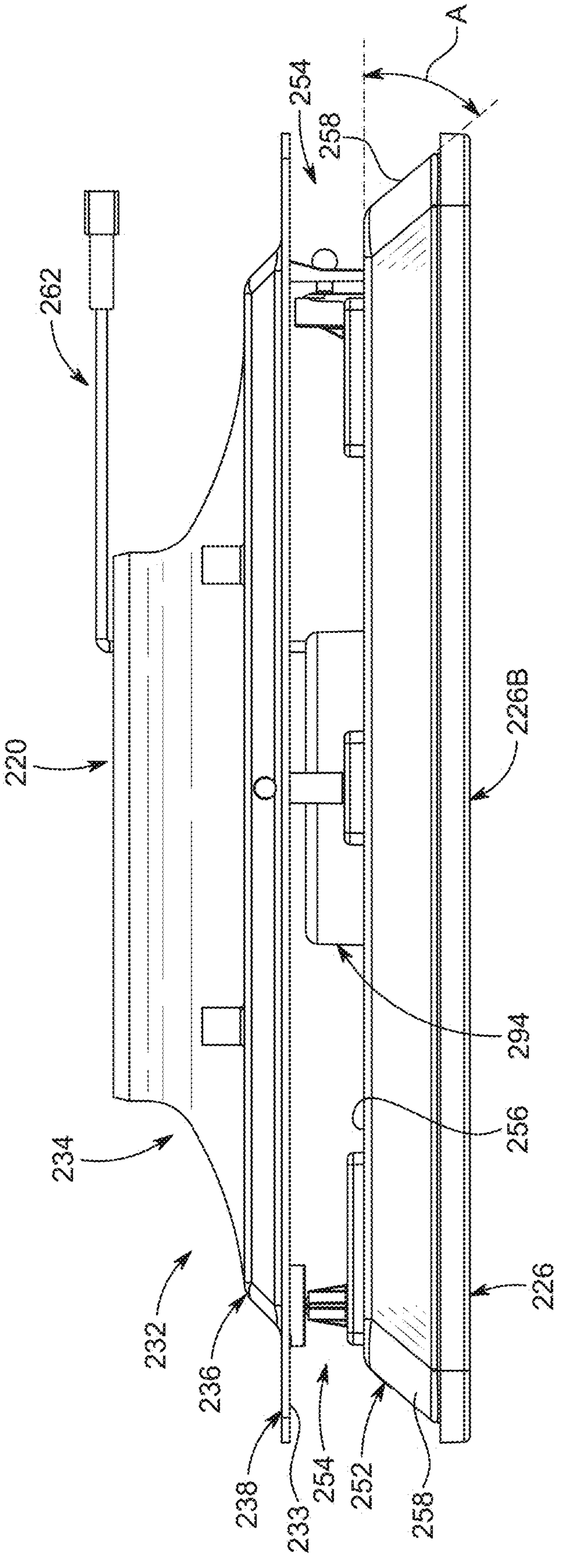
FIG. 19 is a side elevation view of the portion of the lighting and ventilating system of FIG. 16.
Figure 20:
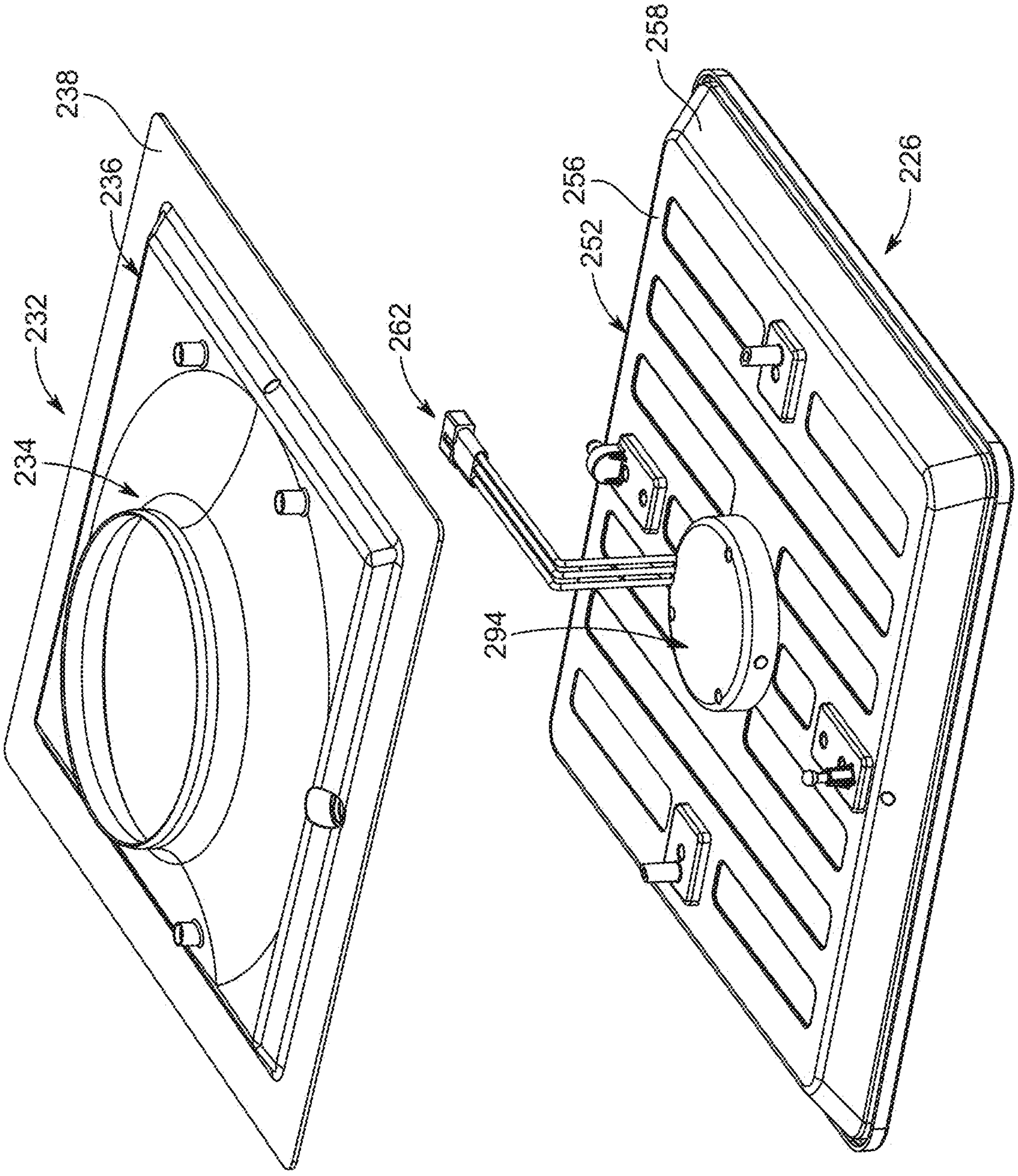
FIG. 20 is a partially exploded assembly view of the portion of the lighting and ventilating system of FIG. 16.
Figure 21:
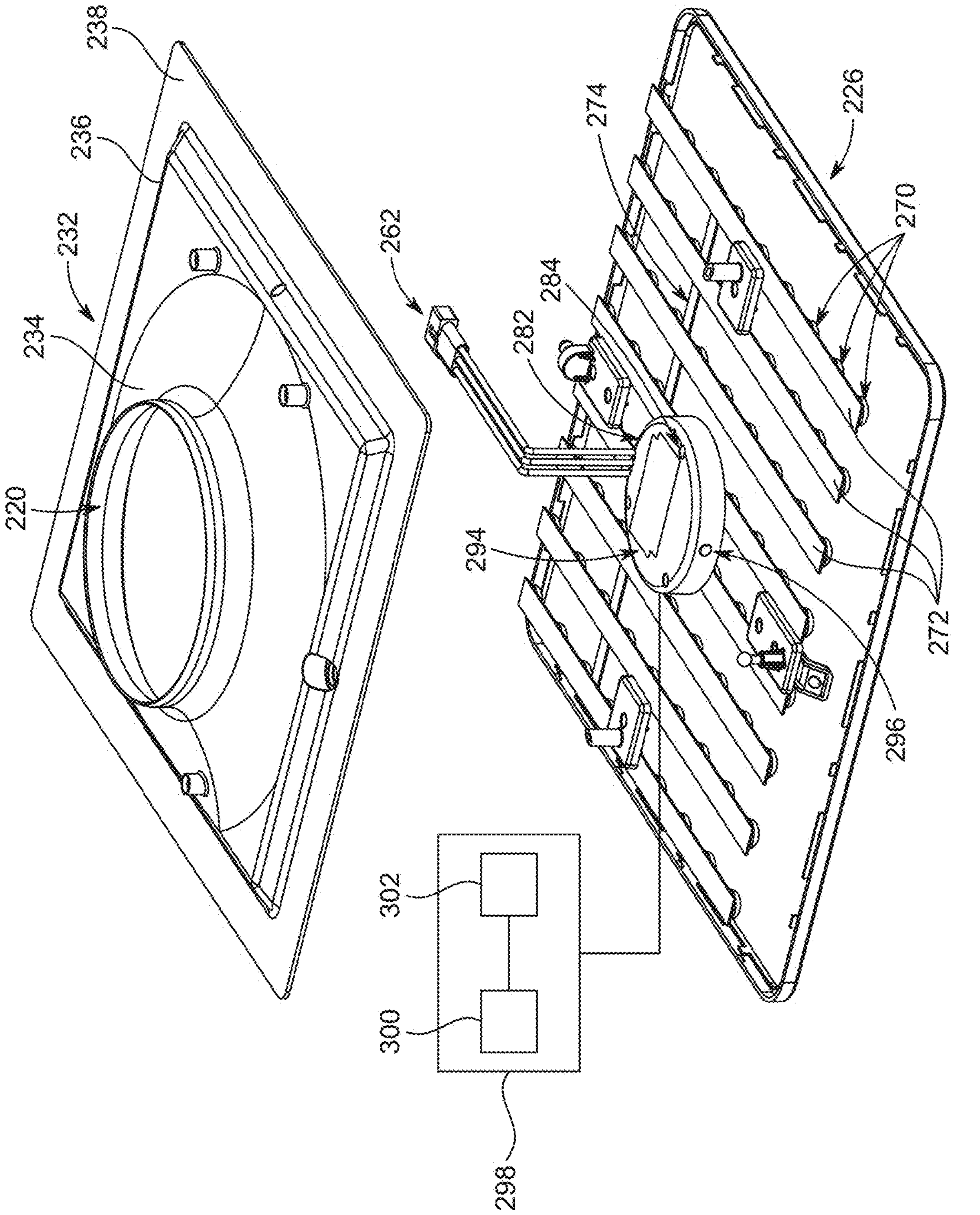
FIG. 21 is another partially exploded assembly view of the portion of the lighting and ventilating system of FIG. 16.

The plate 252 is configured to be coupled to the grille 232, as shown in FIG. 17, and is at least partially spaced apart from the grille 232 to define an air path 254 between the plate 252 and the grille 232 so that air can flow into the main housing 12 after passing between the plate 252 and the grille 232 and through at least one aperture 220. The plate 252 includes a top wall 256 and a plurality of tapered side walls 258 extending downwardly toward the lens 226 and outwardly away from the top wall 256. The top wall 256 is spaced apart from the grill 232 to define the air flow path 254 therebetween. The plurality of side walls 258 extend at an angle A downwardly away from the top wall 256 to increase airflow efficiencies of the system 210. The magnitude of angle A can be varied to minimize air flow resistance and achieve optimum efficiencies.

The lens 226 is coupled removably to a lower end of the plurality of side walls 258. In the illustrative embodiment, the lens 226 incudes a plurality of snaps 227 spaced apart from one another around a periphery of the lens 226. The plurality of snaps are configured to interlock with corresponding portions of the plate 252 to retain the lens 226 to the plate 252. When installed on the plate 252, the lens 226 provides a lowermost portion of the system 210 in the depicted embodiment.

Figure 22:
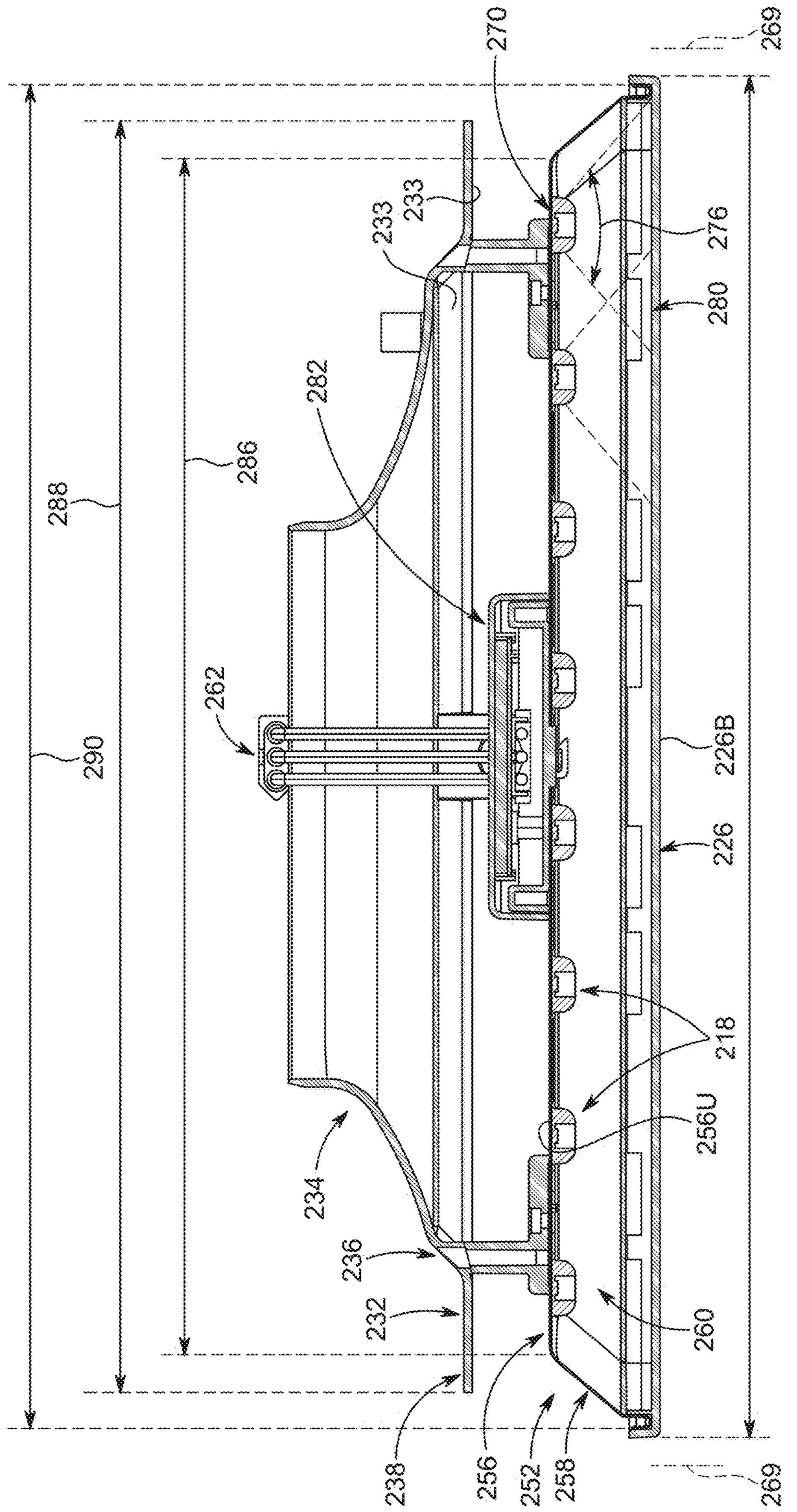
FIG. 22 is a cross section of the portion of the lighting and ventilating system of FIG. 16.

The plate 252 and the lens 226 cooperate to define an interior space 260 therebetween as shown in FIG. 22. The first set of illumination devices 218 are arranged within the interior space 260. In the depicted embodiment, the first set of illumination devices 218 are coupled to an inner side of the top wall 256 of the plate 252 and are arranged in a grid formation along the top wall 256 of the plate 252 within the interior space 260. A wire harness 262 is configured to be coupled to a power source and extends downwardly through the aperture 220 to be coupled to the first set of illumination devices 218. The first set of illumination devices 218 face downward away from the top wall 256 to illuminate the lens 226 when they are activated (i.e. powered on) and disperse light into the adjacent area.

The lens 226, the plate 252, and the grid formation of the first set of illumination devices 218 are preferably sized and arranged relative to one another to provide complete lighting of the lens 226 when the first set of illumination devices 218 are powered on. The top wall 256 of the plate 252 has a first outer perimeter 264 spanning a first area and the grid formation of the first set of illumination devices 218 has a second outer perimeter 266 spanning a second area. In some embodiments, the second area is greater than or equal to about 75% of the first area. This may allow the first set of illumination devices 218 to fully illuminate the lens 226 or eliminate any dark spots and/or hot spots on the lens 226.

In the illustrative embodiment, the lens 226 is made from a translucent material to transmit light generated by the first set of illumination devices 218 through the lens 218 without making the first set of illumination devices 218 visible to a person within the room that the system 210 services. The lens 226 may have a third outer perimeter 268 spanning a third area greater than the first and second areas. This sizing of the plate 252, the illumination devices 218 and the lens 226 allows the entire lowermost portion of the system 210 to illuminate via the lens 226 when the illumination devices 218 are activated while increasing airflow efficiencies of the system 210 via the tapered side walls 258 of the plate 252 defining angle A.

In the illustrative embodiment, the first set of illumination devices 218 includes a plurality of light-emitting diodes 270 and a plurality of strips 272 interconnecting groupings of the plurality of light-emitting diodes 272. In some embodiments, the system 210 can include one or more switches to allow some of the light-emitting diodes 272 to be turned on and off independently from one another.

The grid formation of the first set of illumination devices 218 provides an illumination zone 269 that spans a fourth area greater than or equal to the third area provided by the lens 226. The illumination zone 269 is established by an illumination angle 276 of the outermost light-emitting diodes 270 in the grid formation of the first set of illumination devices 218 as shown in FIG. 22. Each of the light-emitting diodes 270 is spaced apart from one another by a distance that provides overlapping illumination regions 280 in the illumination zone 269. In this way, the illumination zone 269 allows an entirety of a bottom surface 226B of the lens 226 to be illuminated by the light-emitting diodes 270 without any dark spots or hot spots.

The first set of illuminations devices 218 are configured to be activated and provide lighting in a first illumination mode of the ventilating system 210. The system 210 further includes a second illumination device 282 facing upwardly away from the top wall 256 of the plate 252 and configured to illuminate a lower surface 233 of the grille 232 in a second illumination mode of the ventilating system 210. The first illumination mode is a task light in which the first set of illumination devices 218 provide lighting with a first light intensity. The second illumination mode is a night light in which the second illumination device 282 provides a lighting with a second light intensity. The first light intensity is greater than the second light intensity.

The second illumination device 282 includes at least one light emitting diode 284 that is configured to illuminate the lower surface 233 of the grille 232 for indirect, low-intensity lighting of the adjacent living space in the second illumination mode. The plurality of strips of light-emitting diodes 270 of the first set of illumination device 218 may include a number of individual light-emitting diodes greater than the at least one light-emitting diode 284 of the second illumination device 282. Although only a single light-emitting diode 284 can be used, the illustrative embodiment includes three light-emitting diodes 284 for the second illumination device 282. In other embodiments, any suitable number of light-emitting diodes 284 can be used to comprise the second illumination device 282.

Referring again to FIG. 22, the top wall 256 has a first outer width 286, the perimeter frame 238 has a second outer width 288, and the plurality of side walls 258 have a third outer width 290. The second width 288 is greater than the first outer width 286, and the third outer width 290 is greater than the second outer width 288 and the first outer width 286. The lens 226 may generally correspond with the outer width 290 of the plurality of side walls 258. This sizing substantially obstructs view of the grille 232 from the room which the system 210 services, while the perimeter frame 238 projects beyond the width 286 of the top wall 256. When the second illumination device 282 is activated, light is reflected off at least the perimeter frame 238 for indirect lighting of the room. The tapered side walls 258 defining angle A allow the perimeter frame 238 to be at least partially visible from the room so that the low intensity light provided by the second illumination device 282 provides the second illumination mode.

The lens 226 may have an outer width 292 that is greater than or equal to the third outer width 290. The illumination zone 269 may extend beyond the outer width 292 of the lens 226 when the light generated by the light-emitting diodes 270 intersects the bottom wall 226B of the lens 226. Thus, substantially all of the bottom wall 226B is directly illuminated by the light-emitting diodes 270.

In the illustrative embodiment, the second illumination device 282 may further include a junction box 294 mounted to an upper surface 256U of the plate 256, a photosensor 296 coupled to the junction box 294, and a control system 298 including a processor 300 and a memory storage device 302. The junction box 294 is spaced apart from the grille 232. The at least one light-emitting diode 284 is coupled to the junction box 294 and faces upwardly away from the junction box 294 and toward the grille 232. In some embodiments, the junction box 294 may be made of a translucent material and the at least one light-emitting diode 284 can be located beneath the junction box 294 to illuminate the junction box 294 in the second illumination mode. The photosensor 296 is configured to sense light intensity levels around the junction box 294. The control system may be configured to automatically activate the at least one light-emitting diode 284 to provide the second illumination mode when the first set of illumination devices are deactivated. In some embodiments, the control system 298 may be configured to automatically activate the at least one light-emitting diode 284 to provide the second illumination mode when the light intensity sensed by the photosensor 296 reaches a predetermined threshold (i.e. when light intensity is below a threshold, such as after sundown).

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The invention claimed is:

1. A ventilating system comprising:

a main housing defining an inlet configured to receive air into the main housing and an outlet configured to allow the air to exit the main housing;

a fan in the main housing and configured and arranged to generate a flow of air into the main housing through the inlet and from the main housing through the outlet;

a grille comprising a wall defining at least one aperture, and an upper flange extending from the wall and defining a plane, wherein the grille is configured to be located adjacent to the housing such that air passing through the at least one aperture is received into the main housing;

a plate configured to located within the at least one aperture to define an air path between the plate and the wall of the grille a set of illumination devices positioned to illuminate the plate.

2. The ventilating system of claim 1, wherein the plate is in a plane substantially congruent with the plane of the upper flange.

3. The ventilating system of claim 2, wherein the set of illumination devices is positioned so that their illumination is directed inward and diffuses through the plate.

4. The ventilating system of claim 1, wherein the plate is substantially square.

5. The ventilating system of claim 1, wherein the plate defines a recess and the set of illumination devices is at least partially disposed within the recess.

6. The ventilating system of claim 1, wherein the set of illumination devices is coupled to the plate.

7. The ventilating system of claim 6, wherein the recess defines a textured surface.

8. The ventilating system of claim 1, wherein the set of illumination devices is coupled to the plate.

9. The ventilating system of claim 1, wherein the grill further comprises a support flange extending from the grille wall into the at least one aperture.

10. The ventilating system of claim 1, wherein the grill further comprises a support flange extending from the grille wall into the at least one aperture and the plate is configured to mount to the support flange.

11. A ventilating system configured to be mounted in an aperture defined in a wall or ceiling of a building structure, the ventilation system comprising:

a main housing defining an inlet configured to receive air into the main housing and an outlet configured to allow the air to exit the main housing;

a fan in the main housing and configured and arranged to generate a flow of air into the main housing through the inlet and from the main housing through the outlet;

a grille comprising a wall defining at least one aperture and configured to be located in the aperture defined in the wall or ceiling, and an upper flange extending from the wall and defining a plane configured to extend over the wall or ceiling, wherein the grille is configured to be located adjacent to the housing such that air passing through the at least one aperture is received into the main housing;

a plate configured to be located within the at least one aperture to define an air path between the plate and the wall of the grille, a set of illumination devices positioned to illuminate the plate.

12. The ventilating system of claim 11, wherein the plate is in a plane substantially congruent with the plane of the upper flange.

13. The ventilating system of claim 11, wherein the plate defines a recess and the set of illumination devices is at least partially disposed within the recess.

14. The ventilating system of claim 11, wherein the set of illumination devices is coupled to the plate.

15. The ventilating system of claim 14, wherein the recess defines a textured surface.

16. The ventilating system of claim 11, wherein the set of illumination devices is coupled to the plate.

17. The ventilating system of claim 11, wherein the grill further comprises a support flange extending from the grille wall into the at least one aperture and the plate is configured to mount to the support flange.

18. A grille and plate for a ventilating system having a main housing configured to be mounted in an aperture defined in a wall or ceiling of a building structure, the grille comprising:

a wall defining at least one aperture and configured to be located in the aperture defined in the wall or ceiling, and an upper flange extending from the wall and defining a plane configured to extend over the wall or ceiling, wherein the grille is configured to be located adjacent to the housing such that air passing through the at least one aperture is received into the main housing;

wherein the plate is configured to be located within the at least one aperture to define an air path between the plate and the wall of the grille, and a set of illumination devices positioned to illuminate the plate.

19. The grille and plate of claim 18, wherein the plate is in a plane substantially congruent with the plane of the upper flange.

20. The grille and plate of claim 18, wherein the grill further comprises a support flange extending from the grille wall into the at least one aperture and the plate is configured to mount to the support flange.

* * * * *